US009042695B2

(12) United States Patent
Donlagic

(10) Patent No.: US 9,042,695 B2
(45) Date of Patent: May 26, 2015

(54) LOW BENDING LOSS MULTIMODE FIBER TRANSMISSION SYSTEM

(75) Inventor: Denis Donlagic, Maribor (SI)

(73) Assignee: OPTACORE D.O.O. OPTICAL FIBERS, Ljubljana (SI)

(*) Notice: Subject to any disclaimer, the term of this patent is extended or adjusted under 35 U.S.C. 154(b) by 1962 days.

(21) Appl. No.: 12/246,194

(22) Filed: Oct. 6, 2008

(65) Prior Publication Data

US 2009/0092365 A1    Apr. 9, 2009

Related U.S. Application Data

(60) Provisional application No. 60/977,949, filed on Oct. 5, 2007.

(51) Int. Cl.

| G02B 6/02 | (2006.01) |
|---|---|
| G02B 6/028 | (2006.01) |
| G02B 6/036 | (2006.01) |
| G02B 6/14 | (2006.01) |
| G02B 6/255 | (2006.01) |

(52) U.S. Cl.
CPC .......... *G02B 6/0288* (2013.01); *G02B 6/03622* (2013.01); *G02B 6/14* (2013.01); *G02B 6/2551* (2013.01)

(58) Field of Classification Search
None
See application file for complete search history.

(56) References Cited

U.S. PATENT DOCUMENTS

| 4,838,643 A | 6/1989 | Hodges et al. |
|---|---|---|
| 4,852,968 A | 8/1989 | Reed |
| 5,032,001 A | 7/1991 | Shang |
| 5,175,785 A | 12/1992 | Dabby |
| 5,278,931 A | 1/1994 | Antos et al. |
| 6,185,346 B1 * | 2/2001 | Asawa et al. ............ 385/28 |
| 6,711,330 B1 | 3/2004 | Donlagic |

(Continued)

FOREIGN PATENT DOCUMENTS

| JP | 2006/047719 | 2/2006 |
|---|---|---|
| JP | 2006/078543 | 3/2006 |

(Continued)

OTHER PUBLICATIONS

Buck, John A. "Fundamentals of Optical Fibers." *Wiley Series in Pure and Applied Optics*. John Wiley and Sons, Inc., New York (1995), pp. 101-110.

(Continued)

*Primary Examiner* — Sung Pak
(74) *Attorney, Agent, or Firm* — Merchant & Gould P.C.

(57) ABSTRACT

A bend-loss tolerant multimode fiber transmission system is provided. The system includes: a transmission fiber having a core and a cladding, and a mode-launching system for selectively exciting only a useful portion of the transmission modes, that portion corresponding to high effective refractive indices relative to a refractive index of the cladding the useful portion corresponding to a substantial number of modes. The mode-launching system may include a lead-in fiber, coupled to the transmission fiber, supporting a number of lead-in modes substantially corresponding to the number of transmission modes in the useful portion. The transmission fiber may have a refractive index profile, within a region of its core that is aligned with the lead-in fiber core, which has a shape that matches a refractive index profile shape in the lead-in fiber core. The transmission fiber core may have a graded refractive index profile that is parabolic or nearly parabolic or truncated.

55 Claims, 18 Drawing Sheets

(56) References Cited

U.S. PATENT DOCUMENTS

| | | | |
|---|---|---|---|
| 6,771,865 B2 | 8/2004 | Blaszyk et al. | |
| 6,856,742 B2 | 2/2005 | Broeng et al. | |
| 6,901,196 B2 | 5/2005 | Takahashi et al. | |
| 6,947,652 B2 | 9/2005 | Varner et al. | |
| 7,142,757 B1 | 11/2006 | Ward | |
| 7,283,701 B2 * | 10/2007 | Hallemeier et al. | 385/28 |
| 8,326,097 B2 * | 12/2012 | Cunningham | 385/31 |
| 2006/0034574 A1 | 2/2006 | Guan et al. | |

FOREIGN PATENT DOCUMENTS

| WO | WO 01/37008 A2 | 5/2001 |
|---|---|---|
| WO | WO 2007/034923 A1 | 3/2007 |

OTHER PUBLICATIONS

Bunge et al. "Study of Simplified Test Procedure for 10-GB-Ethernet Fibers." *IEEE Photonics Technology Letters*. vol. 14, No. 11 (2002), pp. 1539-1541.

Gauthier et al. "Theoretical and experimental considerations for a single-mode fiber-optic bend-type sensor." *Applied Optics*. vol. 36, No. 25 (1997), pp. 6264-6273.

Donlagic et al. "Microbend Sensor Structure for Use in Distributed and Quasi-Distributed Sensor Systems Based on Selective Launching and Filtering of the Modes in Graded Index Multimode Fiber." *Journal of Lightwave Technology*. vol. 17, No. 10 (1999), pp. 1856-1868.

Donlagic et al. "Opportunities to Enhance Multimode Fiber Links by Application of Overfilled Launch." *Journal of Lightwave Technology*. vol. 23, No. 11 (2005), pp. 3526-3540.

Donlagic et al. "Propagation of the fundamental Mode in Curved Graded Index Multimode Fiber and Its Application in Sensor Systems." *Journal of Lightwave Technology*. vol. 18, No. 3 (2000), pp. 334-342.

Marcuse, Dietrich. *Theory of Dielectric Optical Waveguides*. Second. Boston: Academic Press, Inc., 1991.

Pepeljugoski et al. "15.6-Gb/s Transmission Over 1 km of Next Generation Multimode Fiber." *IEEE Photonics Technology Letters*. vol. 14, No. 5 (2002), pp. 717-719.

Pepeljugoski et al. "Development of System Specification for Laser-Optimized 50-μm Multimode fiber for Multigigabit Short-Wavelength LANs." *Journal of Lightwave Technology*. vol. 21, No. 5 (2003), pp. 1256-1275.

Pepeljugoski et al. "Modeling and Simulation of Next-Generation Multimode Fiber Links." *Journal of Lightwave Technology*. vol. 21, No. 5 (2003), pp. 1242-1255.

Schlager et al. "Measurements for Enhanced bandwidth Performance Over 62.5-μm Multimode Fiber in Short-Wavelength Local Area Networks." *Journal of Lightwave Technology*. vol. 21, No. 5 (2003), pp. 1276-1285.

* cited by examiner

LOW BENDING LOSS MULTIMODE FIBER TRANSMISSION SYSTEM

FIELD OF THE INVENTION

The present invention relates generally to bend resistant fibers for optical communication and other fiber optic systems. More particularly, the present invention is directed to a multimode fiber transmission system which is highly resistant to the loss caused by bending of the transmission fiber.

BACKGROUND OF THE INVENTION

Attenuation of optical signal in optical fibers caused by the fiber or cable bending has been one of the major concerns in fiber, cable and photonic device manufacturing. There are an increasing number of applications where optical fibers need to be routed through constrained spaces or where fibers need to be matched or mounted tightly to structures having arbitrary shapes and forms. In such environments, a significant number of tight bends can be expected down the transmission fiber route. Fibers with high bend tolerance are therefore required in such environments. Typical examples are in-house and in-building wiring in fiber-to-the-home (FTTH) systems, fly-by-light wiring systems in modern aircrafts, sensor applications where optical sensors connect to signal processors through optical fibers, and other similar applications. There are also various optical devices and systems like optical amplifiers, fiber lasers, optical delay lines and pay-out systems for remotely guided autonomous vehicles or projectiles that use substantial lengths of coiled optical fibers. Sizes of such devices are limited by the bend loss tolerance of optical fibers used. Better bend loss tolerant fiber allows for construction of smaller and more compact devices.

A large portion of the work relating to improvement of bend loss sensitivity has been carried out for single-mode fibers and fiber systems. The improvement of bend tolerance in single-mode fiber may be achieved through the fiber refractive index profile of double cladding structures, as described for example in U.S. Pat. No. 4,838,643. Similar approaches based on the shaping of the outer part of the core are described in U.S. Pat. No. 5,278,931 and U.S. Pat. No. 6,771,865. Index depression (index trench) may also be used to improve fiber bend tolerance. Variations of these solutions are presented in U.S. Pat. No. 4,852,968, U.S. Pat. No. 5,032,001, U.S. Pat. No. 6,901,196, and U.S. Pat. No. 6,947,652. Many of the presented solutions reduce the mode field diameter of the fundamental mode, when compared to standard single mode fiber such as Corning SMF-28, resulting in an increased loss when bend resistant fibers are spliced to standard telecommunication fiber. Alternative solutions are proposed in U.S. Pat. No. 5,175,785 and U.S. Pat. No. 6,711,330 where few-mode or even multimode fibers are used to transmit the light with fundamental mode of the fiber and thereby provide single mode operation of the transmission link. In the latter case, the mode field can be relatively large, while providing good bend tolerance of the fiber transmission system. While the transmission channel is single mode, the presence of higher order modes cannot be completely excluded, which prohibits application of such systems in various single-mode applications. Another solution, that allows single-mode and nearly single-mode operation of the fiber while maintaining large mode field diameter of the fundamental mode, relies on application of photonic crystal fibers, more precisely on the introduction of air holes around the core of the fiber. This concept is presented in U.S. Pat. No. 6,856,742, WO01/37008, WO2007034923 and U.S. Pat. No. 7,142,757.

As briefly summarized in the previous paragraph, there are various methods available in the art that can provide high bend tolerance of single mode fibers. However, there are only few and limited solutions that can improve bend tolerance of multimode transmission systems. Multimode fibers are widely deployed in short range optical transmission applications. Local area networks, short range industrial wiring, short range computer to computer communications, optical sensor interconnections and military applications often rely on multimode fibers as they provide easier and more reliable connectivity and lower cost terminal equipment. In such applications, fibers are in many cases routed through numerous constricted space areas and this implies the presence of tight bends.

There are several serious limitations that restrict design opportunities for bend resistant multimode fibers. Since multimode fibers support a large number of modes and each mode bears individual bend loss characteristics, it is difficult to control bend loss and other waveguide properties of all propagating modes at once. In general, groups of modes that have high effective refractive index also exhibit high bend tolerance, while groups of modes with low effective refractive index show poor bend performance. Furthermore, it is often desired that the multimode fiber profile minimizes differences in group velocities between propagating modes, otherwise the modal dispersion and thereby bandwidth of the transmission multimode fiber can become severely degraded. This is especially true of high bandwidth transmission multimode fibers where even minor intervention into the optimum shape of the graded index profile inevitably leads to serious degradation of transmission fiber bandwidth. Finally, it is also desired that bend resistant multimode fiber exhibits good compatibility with existing standard multimode fibers and terminal equipment to allow for effective and economical interconnectivity.

A couple of known approaches for bend-tolerant, multimode fiber designs are presented for example in patent applications JP 20060785543 and JP 2006047719. Both of these approaches employ a trench concept that helps confine the modes within the core and increases mode field roll-off in the cladding, which reduces higher order mode power leakage in the cladding in the bent fiber. The trench depth and width is limited by the production process in silica fibers and also by propagation of spurious modes guided by the trench that can severely degrade the fiber performance. Location of the trench close to the fiber core also affects higher order mode group velocities that can result in significant degradation of fiber bandwidth. Approaches presented in other known art include holey assisted multimode fiber design where series of holes is placed around the core to improved guidance of the light within the core as presented in US 20060034574. The holey fibers are difficult to splice, and the high index contrast holes can compromise the fiber bandwidth and can induce additional guidance losses while providing limited improvement in bend loss performance.

SUMMARY OF THE INVENTION

It is a preferred object of the present invention to provide a multimode fiber transmission system which has low bend losses and is therefore bend resistant, i.e. bend-loss resistant or bend-loss tolerant.

In accordance with an aspect of the present invention, there is provided a bend-loss tolerant multimode fiber transmission system. The system includes: a transmission fiber having a core and a cladding surrounding the core, the transmission fiber supporting a group of transmission modes for light within a target spectral range, a useful portion of the transmission modes having high effective refractive indices relative to a refractive index of the cladding, the useful portion corresponding to a substantial number of modes; and a mode-launching system for selectively exciting the transmission modes of the transmission fiber belonging only to the useful portion.

The mode-launching system may include an optical source.

Alternatively, the mode-launching system may include a lead-in fiber coupled to the transmission fiber, the lead-in fiber having a core and a cladding surrounding the core, the lead-in fiber supporting a number of lead-in modes substantially corresponding to the number of transmission modes in the useful portion of the group of transmission modes of the transmission fiber.

The transmission fiber may have a refractive index profile, within a region of the core thereof aligned with the core of the lead-in fiber, which has a shape that matches a refractive index profile shape in the core of the lead-in fiber. The core of the transmission fiber may have a graded refractive index profile defining a parabolic or nearly parabolic shape. The refractive index profile shape may further be truncated.

The lead-in fiber may be a standard telecommunication multimode fiber.

The bend-loss tolerant multimode fiber transmission system may include an optical receiver coupled to the transmission fiber. The optical receiver may be coupled to the transmission fiber via a lead-out fiber spliced to the transmission fiber.

In accordance with an embodiment of the invention, the bend-loss tolerant multimode fiber transmission system may include: a transmission fiber having a core and a cladding surrounding the core, the transmission fiber supporting a group of transmission modes, a useful portion of the transmission modes having high effective refractive indices relative to a refractive index of the cladding, the useful portion corresponding to a substantial number of modes; and a mode-launching system for selectively exciting the transmission modes of the transmission fiber belonging only to the useful portion; wherein:
 the mode-launching system comprises a lead-in fiber coupled to the transmission fiber, the lead-in fiber including:
  a core having a given lead-in core radius and a given excitation refractive index profile for exciting the transmission modes of the transmission fiber belonging only to the useful portion; and
  a cladding surrounding the core and having a given lead-in cladding refractive index profile;
 the core of the transmission fiber including:
  an inner region having a radius equal to or greater than the lead-in core radius and having a transmission core refractive index profile that has a shape that relatively matches the excitation refractive index profile of the core of the lead-in fiber and absolute refractive index values higher than absolute refractive index values of the excitation refractive index profile; and
  an outer region surrounding the inner region and having a graded refractive index profile; and
 the cladding of the transmission fiber has a transmission cladding refractive index profile.

The graded refractive index profile of the outer region of the core of the transmission fiber may be truncated down to a refractive index of the transmission cladding refractive index profile.

The graded refractive index profile of the outer region may have absolute refractive index values lower than absolute values of the lead-in cladding refractive index profile.

The cladding of the transmission fiber may include a region that has absolute values of the transmission cladding refractive index profile that are lower than absolute values of the lead-in cladding refractive index profile.

The shape of the transmission core refractive index profile of the inner region may be nearly parabolic.

The graded refractive index profile of the outer region of the core of the transmission fiber may be a continuation of a refractive index profile of the inner region. In addition, the graded refractive index profile of the outer region of the core of the transmission fiber may be truncated. It may be truncated down to a refractive index of the transmission cladding refractive index profile.

In accordance with another aspect of the invention there is provided, a transmission fiber of a bend-loss tolerant multimode fiber transmission system for light propagating in standard multimode fiber modes. The transmission fiber includes a core and a cladding surrounding the core, the transmission fiber supporting a group of transmission modes for light within a target spectral range, a useful portion of the transmission modes having high effective refractive indices relative to a refractive index of the cladding, the useful portion corresponding to a substantial number of modes.

The core of the transmission fiber may have a graded refractive index profile. The refractive index profile shape may be parabolic or nearly parabolic. It may also be truncated.

The cladding of the transmission fiber may have a transmission cladding refractive index profile. The core of the transmission fiber may have: an inner region supporting the substantial number of modes that have effective refractive index values substantially higher than a refractive index value of the cladding of the transmission fiber; and an outer region surrounding the inner region.

The outer region of the core of the transmission fiber may have a graded refractive index profile that is truncated down to a refractive index of the transmission cladding refractive index profile. In another alternative, the outer region of the core of the transmission fiber may have a graded refractive index profile that is a continuation of the transmission core refractive index profile of the inner region.

Other features and advantages of the present invention will be better understood upon reading of preferred embodiments thereof with reference to the enclosed drawings.

DESCRIPTION OF PREFERRED EMBODIMENTS OF THE INVENTION

Figure 1A:
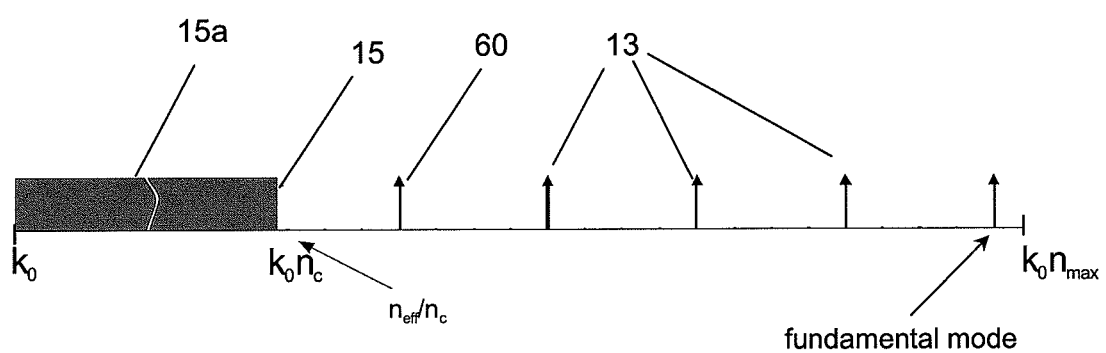
FIG. 1a is a diagram of the mode distribution in the phase constant space of a multimode fiber with high numerical aperture, showing the increased separation of the modes.

The present invention will be described more fully hereinafter with reference to the accompanying drawings, FIGS. 1 to 11.

In accordance with an embodiment of present invention, there is provided a high bend-loss tolerant multimode fiber transmission system, which may also be compatible (assure low splicing loss) with standard or other multimode fibers and provide low modal dispersion and thereby maintain bandwidth similar to standard telecom multimode fibers. It is to be understood that the expression "bend-loss tolerant" is used herein to refer to a fiber transmission system in which a bending of the transmission fiber induces no losses or low loss of the light guided by the system, within acceptable limits of the target application. The expressions "bend-loss tolerant", "bend-resistant", "bend-loss resistant" and "bend tolerant" are used herein interchangeably.

When an optical fiber is exposed to bending, two types of bend-related losses are generally encountered: microbend loss and macrobend loss. Each type of bend-related loss possesses a distinctive set of characteristics and is preferably treated separately in the design of bend-resistive multi-mode fibers.

In most commonly used multimode fibers, microbend loss occurs due to the coupling between core-guided modes and cladding modes. Bend-initiated mode coupling occurs as a consequence of small, usually random, fiber core displacements along the fiber axis.

It is known that there exists a non-linear relationship between the phase constant difference between modes propagating in an optical fiber, and the magnitude of their coupling coefficients: the larger the phase constant difference between two modes, the lower the coupling caused by core perturbation. Microbend loss being non-linearly proportional to the separation in phase constant space between the higher order guided modes and cladding modes, it is usually of concern when the separation is small or the fiber core displacement amplitude is large over longer spans of fiber (for example, in squeezed or improperly designed cable). A detailed description of phenomena can be found in the work of D. Marcuse, for example in *Theory of Dielectric Optical Waveguides*, second edition, Academic Press, Boston, 1991.

In standard multimode fibers having a nearly parabolic refractive index profile, modes become grouped in relatively well separated modal groups in the phase constant space. For example, the phase constant difference between modal groups (i.e. the modal group spacing) in telecommunication graded-index multimode fiber (GI-MMF) corresponds to a spatial mode beatlength period of about 1 to 1.2 mm in both 50 µm and 62.5 µm standard telecommunication fibers (e.g. $2\pi/$(phase constant difference) is between 1 and 1.2 mm), and is generally larger than that encountered in most practical polarization maintaining fibers. This relatively large spacing of modal groups in phase constant space prevents significant mode coupling losses when the fiber is exposed to shorter sharply curved sections, such as for example encountered during routing of the fiber through constrained spaces with multiple 90-degree bends. In most practical environments (in house FTTH, fly-by light systems, fiber coils, etc) proper cabling and fiber packaging can avoid substantial perturbation of the fiber core within this range of spatial frequencies, e.g. cable perturbation period around resonance frequency (1-1.2 mm) can be avoided. Therefore, microbend loss is not usually the dominant bend loss mechanism in most practical applications.

The other type of bend loss encountered during practical bending of the fiber to a small radius, the macrobend bend loss, is caused by partial loss of the modal wavefront guidance at the outer side of a curved optical waveguide.

When a modal wavefront propagates through a curved waveguide, the phase velocity at the outer side of the curvature increases proportionally to the radial distance measured from the curvature center of the waveguide in order to compensate for the longer path length that optical wave needs to travel at the outer side of the curvature, i.e. the increased path length with increasing radius of curvature. Since the average phase velocity of a mode wavefront in a curved and a straight fiber is about the same, the local value of the mode phase constant $\beta_c(r)$ in the curved fiber can be expressed as:

$$\beta_c(r) \approx \frac{R}{r}\beta \quad (1)$$

where r is the radial distance measured from the center of curvature, R is the radius of curvature of the fiber core, and $\beta$ is the phase constant of the mode in a straight fiber.

This increase in local phase velocity of the mode wavefront is however limited by speed of light in the cladding. When local phase velocity reaches the speed of light in the cladding, the part of the wavefront beyond this point would need to exceed the speed of light in the cladding and therefore detaches itself from the original mode wavefront and propagates in a radial direction.

The radial position of the dissociation caustic where the fraction of propagating modal power starts to irreversibly detach itself from the original wave front is thus located at radial distance $r_c$ at which the mode phase constant of expression (1) equals the free space propagation constant in the fiber cladding:

$$\beta_c(r_c) = \frac{R}{r_c}\beta = k_0 n_c \quad (2)$$

where $k_0$ is free space propagation number and $n_c$ is the effective refractive index of the cladding. The situation for an arbitrary mode of GI-MMF is depicted graphically in FIG. 11.

The loss per unit length in the curved fiber is thus determined by the amplitude of the mode field at the dissociation caustic, e.g. by the amplitude of the mode field at radial distance $r_c$. The $r_c$ can be expressed from equation (2) as:

$$r_c = \frac{\beta}{k_0}\frac{R}{n_c} = \frac{n_{\mathit{eff}}}{n_c}R \quad (3)$$

where $n_{\mathit{eff}} = \beta/k_0$ is the effective refractive index of the observed mode in the core of the fiber. Since the mode field roll-off is approximately exponential in the cladding, the loss per unit length depends highly non-linearly on the radius of curvature R and the ratio $n_{\mathit{eff}}/n_c$. From this simple qualitative description, one can see that the $n_{\mathit{eff}}/n_c$, the ratio of the effective refractive index of the observed mode and the cladding index, plays an important role in mode bend loss sensitivity. The bend loss tolerance of a fiber mode may be increased by increasing this ratio.

Since the average phase velocity of a mode wavefront in either a curved or a straight fiber is about the same, the modes that propagate with lower phase velocity in a straight waveguide (e.g. have high effective index) can better tolerate the bending as their wavefronts can considerably increase their local phase velocities at the outer side of the curvature before they start to experience significant, non negligible, dissociation due to the curvature and thereby related optical power loss. The most pronounced factor that affects the macrobend loss tolerance of a particular mode is therefore the difference between mode phase velocity in the straight fiber and the speed of light in the cladding. As shown above in equation (3), this is more conveniently expressed in terms of the ratio between the effective refractive index of the mode and the refractive index of the fiber cladding—a large difference between the effective refractive index of the mode and the refractive index of the cladding assures high macrobend tolerance of the same mode. Detailed description of macrobend loss mechanisms can be found for example in following references: J. A. Bock, *Fundamentals of Optical fibers*, John Wiley and Sons, Inc, New York, 1995; R. C. Gauthier, C. Ross, "Theoretical and experimental consideration for single-mode fiber optic bend-type sensors", APPL. OPT., Vol 36, No 25, 1997, pp. 6264-6273; D. Donlagic and B. Culshaw, "Propagation of the fundamental mode in curved graded index multimode fiber and its application in sensor systems", J LIGHTWAVE TECHNOL, Vol 18, 2000, pp. 334-342: D. Donlagic and B. Culshaw, "Low-loss transmission through tightly bent standard telecommunication fibers", APPL PHYS LETT, Vol 77, 2000, pp. 3911-3913.

In most practical cases, it is a macrobend loss that is of primary concern as it limits the ability to bend the fiber to curvatures having a small radius of curvature, for example, macrobend loss limits the formation of small loops, coils or sharp fiber bends. Microbend loss is mostly caused by random fiber displacement from the fiber axis caused by cabling or squeezing of the fiber with cable or similar structures. A certain degree of microbending is therefore always present in any practical system, but if proper packaging of the fiber is used, it can also be kept at the level that is currently present in various existing fiber systems. Many practical cases requiring improved fiber bend performance therefore usually require an increase in the macrobend resistance of the fiber whereas the microbend sensitivity can be kept at the level of standard fibers.

A seen from the discussion above, macrobend resistance may be improved by increasing the difference between the effective index of propagating modes in the core of a multimode fiber and the refractive index of the cladding that surrounds the multimode core. It is known in the art that for a given core size of multimode fiber, this may be achieved by greatly increasing the numerical aperture of the fiber (e.g. increasing the difference between the index of the core and the index of the cladding). Such an approach would increase the separation between the modes (and modal groups in parabolic or nearly parabolic index multimode fibers). The modal distribution in phase constant space of such a bend-resistant fiber is shown in FIG. 1a. The greater benefit would come from an increase in the separation between the highest order mode 60 and the cladding level 15. However, very high index differences are hard to achieve due to the fiber production limitations, especially if good control over the profile shape is required like in the case of telecommunication graded index profiles. Furthermore, high index differences can lead to quick degradation of achievable bandwidth and increased fiber losses. In addition, simple increase in numerical aperture does not provide the best usage of available refractive index difference between core and cladding as it evenly spreads the propagating modes effective indices between maximum core index and the cladding index.

Figure 1B:
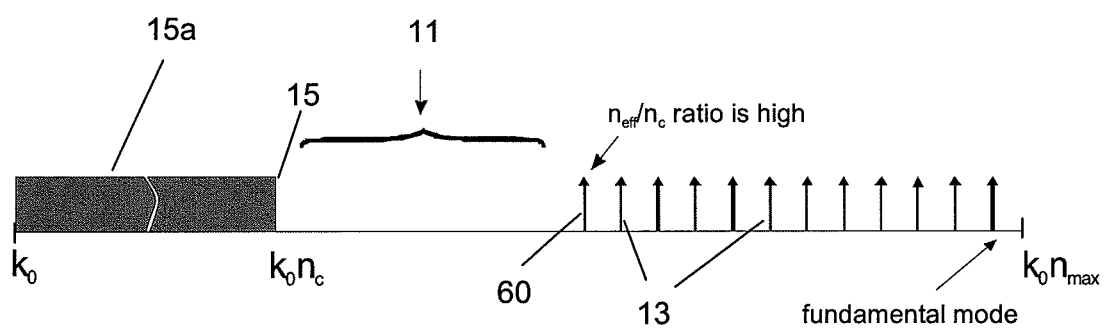
FIG. 1b is a diagram of the mode distribution in the phase constant space of a hypothetical bend-loss resistant multimode fiber.

The major challenge in multimode fiber profile design is to make good usage of available effective index difference that is obtainable by particular fiber production process. The highest order guided mode with the lowest $n_{eff}/n_c$ ratio is in general the most bend-sensitive. An ideal "hypothetical" multimode bend resistant fiber profile would have a modal distribution as shown in FIG. 1b. It would support only the existence of the guided modes 13 that have high values of effective refractive index, i.e. higher $n_{eff}/n_c$, while the modes with lower effective index values, i.e. lower $n_{eff}/n_c$ would not exist. In such a case, all the modes would be well separated from the cladding level 15 and would therefore exhibit high macrobend tolerance (see the large separation 11 between guided modes 13 and cladding level 15 illustrated in FIG. 1b). Large difference between the effective index of the highest order propagating mode relative to the cladding level would in such a case also effectively prevent any mode coupling between guided and cladding modes of the fiber, i.e. it would assure low microbend sensitivity. Unfortunately, such profiles are currently not known in the art as the modes in multimode fibers more or less evenly fill-up entire effective index space ranging from cladding to maximum core refractive index level.

General Description

Figure 2A:
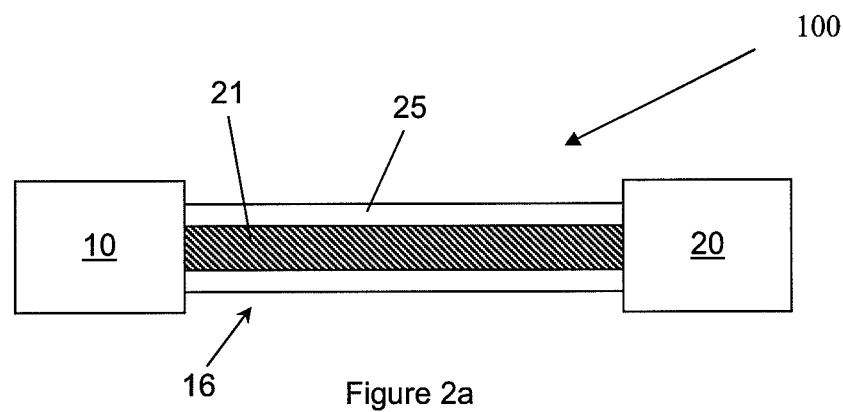
FIG. 2a is a schematic cross-sectional representation of a bend-loss tolerant multimode fiber transmission system, according to an embodiment of the invention.

Referring to FIG. 2a, there is schematically illustrated a bend-loss tolerant multimode fiber transmission system 100 according to an embodiment of the invention.

The system 100 first includes a transmission fiber 16, having a core 21 and a cladding 25 surrounding the core 21. The transmission fiber 16 is multimode, that is, it supports a group of transmission modes for light within a target spectral range.

Figure 1C:
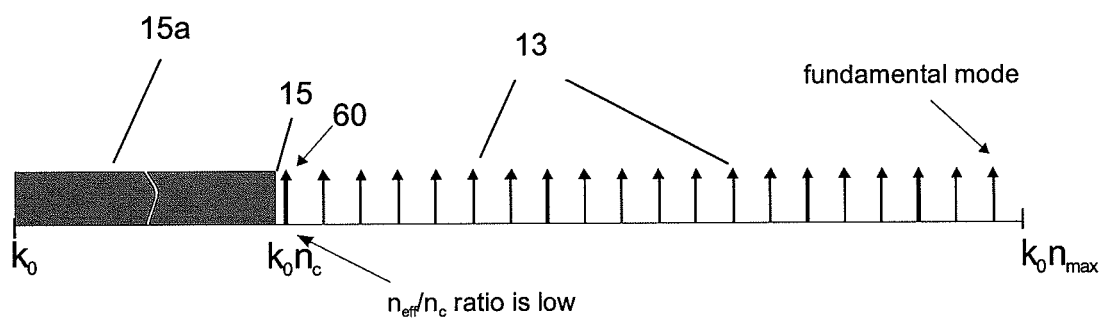
FIG. 1c is a diagram of the mode distribution in the phase constant space of the transmission fiber of a system according to an embodiment of the present invention.

Referring to FIG. 1c, an example of the transmission modes 13 of the transmission fiber is schematized. The transmission modes are spread over available phase constant space, as mentioned above, down to the cladding level 15 of the continuum of cladding modes 15a, those modes not confined to the core of the fiber. Each mode 13 corresponds to an integral mode number and has a corresponding effective refractive index value. The fundamental mode has a maximum value of the effective refractive index, and is generally confined to the center of the core in the case of a graded index core, and therefore has the greatest ratio of core effective refractive index to cladding index $n_{eff}/n_c$. Of all the available modes in the group of transmission modes, only the modes corresponding to the highest effective refractive indices, and therefore the modes of lowest mode number and of high refractive index relative to a refractive index in the cladding, which is understood to mean that the ratio $n_{eff}/n_c$ is sufficient to avoid or limit macrobend loss. These modes define a useful portion 17 of the transmission modes.

The difference in effective refractive index between the lowest order mode of the transmission modes of the transmission fiber belonging only to the useful portion and the highest order mode thereof may be equal to or greater than 0.007. The transmission modes of the transmission fiber belonging only to the useful portion may propagate in a region of the core that has a diameter equal to or greater than ⅔ a diameter of a core of standard multimode fiber.

The transmission fiber is further designed so that the useful portion of the transmission modes corresponds to a substantial number of modes. It should be understand that the term "substantial number of modes" refers to "more than a few modes". The term "substantial" may be defined in several ways, in keeping with the context of the invention. The substantial number of modes may correspond to more than 50% of the number of modes found in standard 50 μm multimode fiber or to more than about 30 modes. The substantial number of modes may include modes having a mode field diameter equal to or greater than one half a diameter of the core of the transmission fiber. Alternatively, the substantial number of modes may correspond to the transmission modes of the transmission fiber belonging only to the useful portion that are excited by a launching spot equal to or greater than 30 μm, or to modes having characteristics of multimode transmission fibers, or to modes of multimode fibers having a core diameter equal to or greater than 25 μm and a numerical aperture equal to or greater than 0.15.

The transmission system of the present invention may be fully integrated to standard industry telecommunication networks or devices to provide fully multimode bend-tolerant light transmission. The term "standard multimode fiber" is understood to include any fiber compatible with industry standards having a multimode profile, and for example include, without being limited to, currently available 50 μm and 62.5 μm telecommunication fibers defined by international standard ITU G.651.

Referring back to FIG. 2a, the bend-loss tolerant multimode fiber transmission system 100 further includes a mode-launching system 10, adapted for selectively exciting the transmission modes of the transmission fiber belonging only to the useful portion. In this manner, the light coupled into the core of the transmission fiber 16 will only be guided by transmission modes which are bend-tolerant.

Figure 2B:
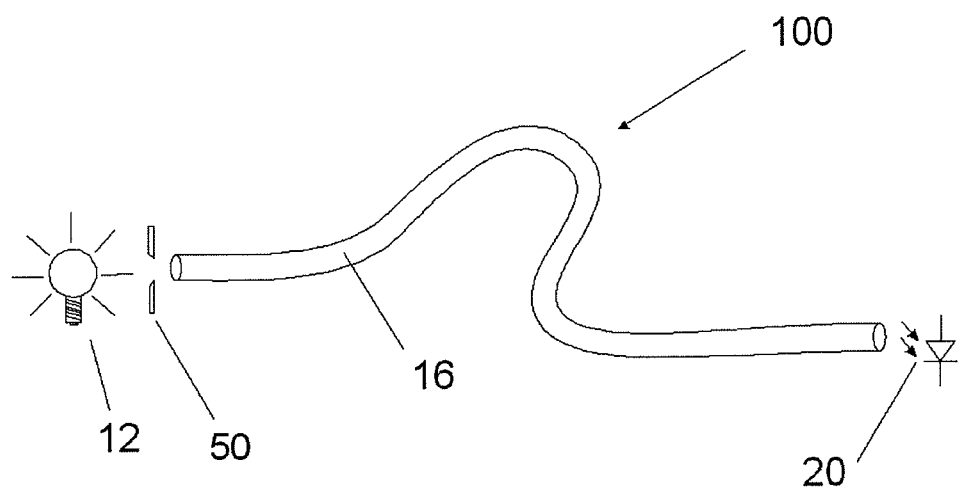
FIG. 2b is a schematic representation of a bend-loss tolerant multimode fiber transmission system, according to an embodiment of the present invention.
Figure 2C:
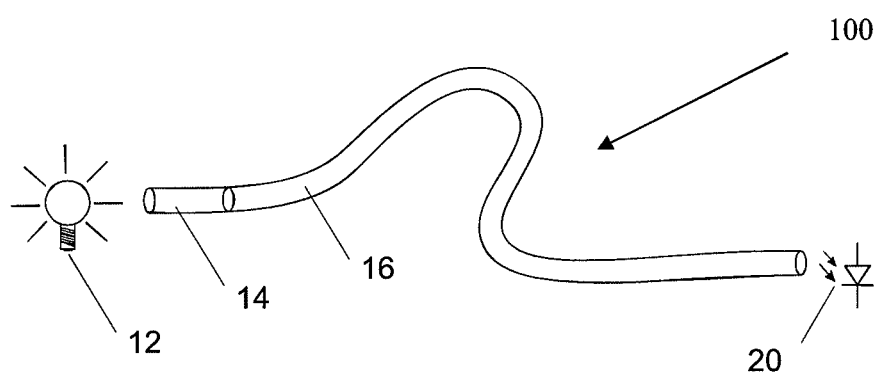
FIG. 2c is a schematic representation of a bend-loss tolerant multimode fiber transmission system, according to an embodiment of the present invention.
Figure 2D:
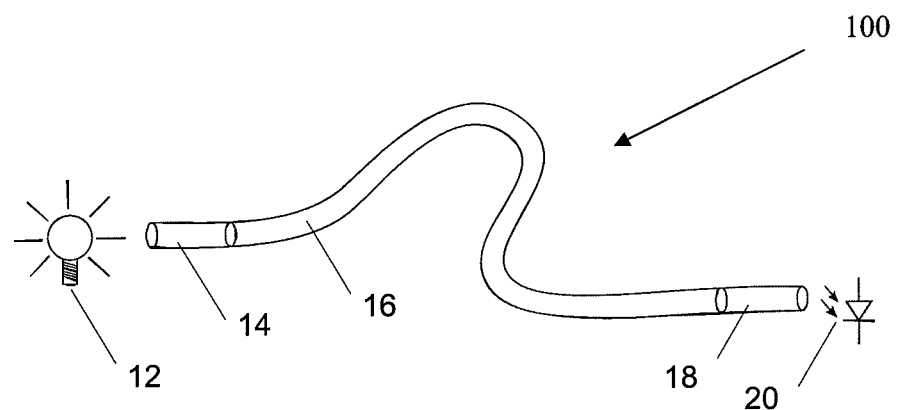
FIG. 2d is a schematic representation of a bend-loss tolerant multimode fiber transmission system, according to an embodiment of the present invention.
Figure 2E:
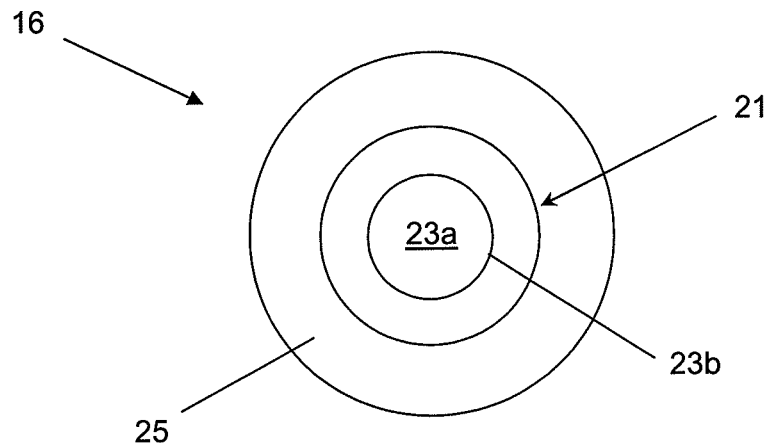
FIG. 2e is a schematic cross-sectional representation of a transmission fiber.

As shown in the embodiments depicted in FIGS. 2b, 2c and 2d, the mode-launching system 10 may include an appropriate optical source 12, for example one capable of selective mode launch. Such source must selectively excite (illuminate) only the part of the core that will result in excitation of the bend resistive modes of the transmission fiber. For example, the mode launching system 10 may further include a slit 50, lenses, or similar device for providing light of a target spectral range. Most spatially coherent sources like for example Fabry-Perot laser diodes, vertical cavity surface emitting lasers or distributed feedback laser diodes can used for this purpose when coupling between transmission fiber and source is accomplished in appropriate way. The preferred embodiment may also include a lead-in fiber 14 coupled to the transmission fiber 16, as shown in FIG. 2d. The latter solution can be effectively used with spatially incoherent sources like light emitting diodes. The solution using a lead-in fiber can provide precise control over modes launched in the transmission fiber and can therefore be used in combination with an arbitrary source. It might be therefore a preferred solution in many practical applications, particularly because most of the commercially available multimode fiber coupled sources are coupled or are designed to be coupled with standard fibers that can be used as lunching fibers.

Figure 2F:
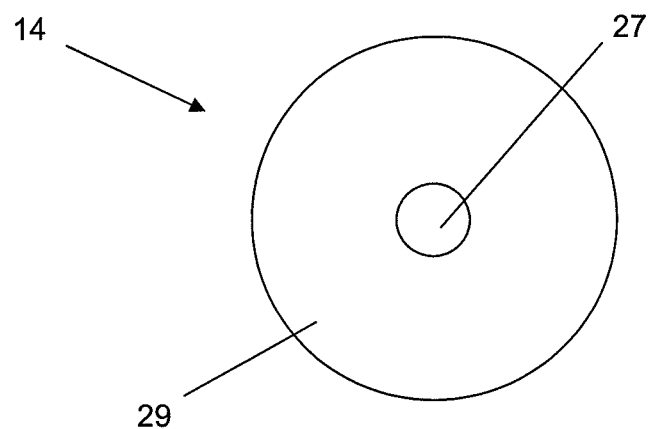
FIG. 2f is a schematic cross-sectional representation of a lead-in fiber.
Figure 2G:
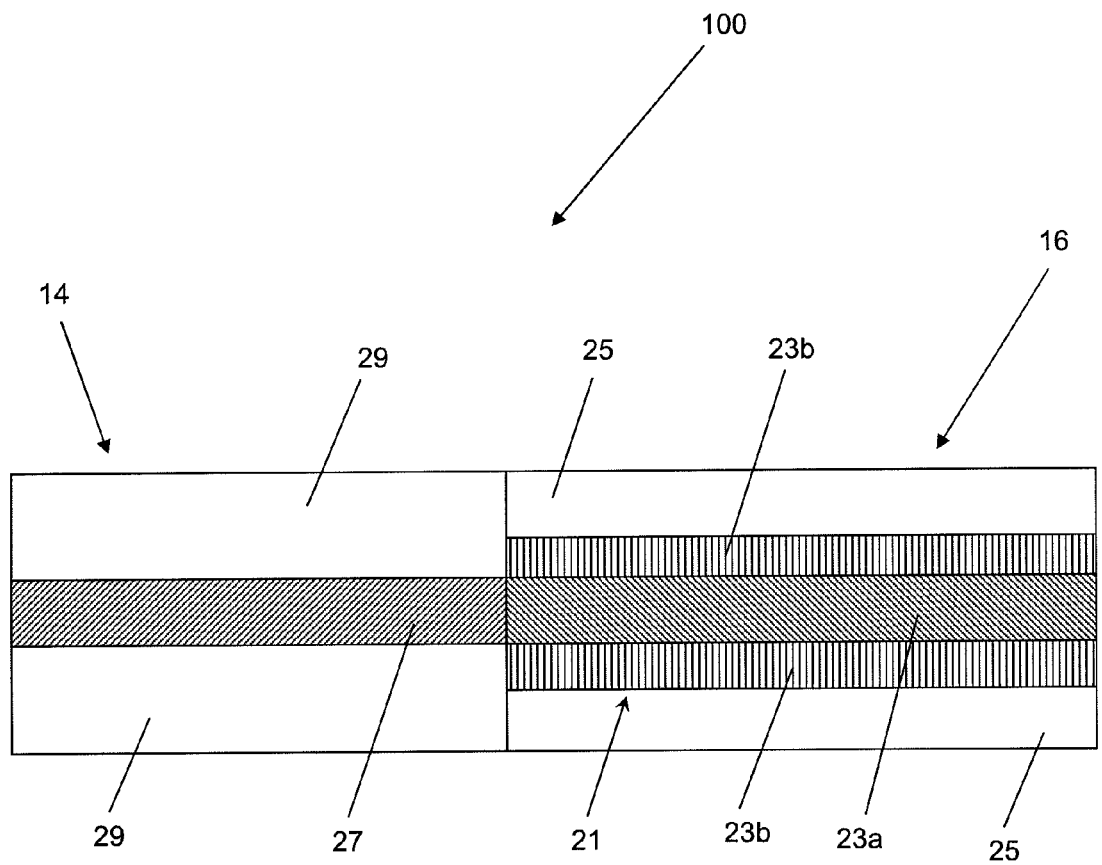
FIG. 2g is a schematic cross-section of a lead-in fiber coupled to a transmission fiber, taken along the length thereof.

The lead-in fiber may be a standard or any other appropriate multimode fiber, like for example defined by international standards ITU G.651 or IEEE 803.2.ae (OM-3). It may have a core 27 and a cladding 29, as depicted in FIG. 2f. In many practical cases, the lead-in fiber may consist of a short section of 50 μm standard graded index multimode telecommunication fiber spliced to the transmission fiber. A graded index fiber, or graded refractive index fiber, is an optical fiber whose core has a refractive index that decreases with increasing radial distance from the fiber axis.

Figure 1D:
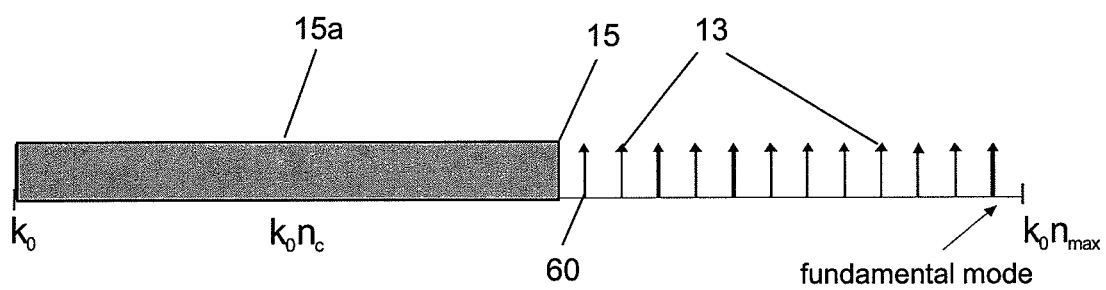
FIG. 1d is a of the mode distribution in the phase constant space of a lead-in fiber of a system according to an embodiment of the present invention.

Referring to FIG. 1d, the mode distribution in the phase constant space of a lead-in fiber according to a preferred embodiment of the invention is shown. The guided modes 13 of the lead-in fiber, preferably a standard telecom GI MMF, are distributed over the available phase constant space up to the cladding level 15. The comparison with the modal distribution of the transmission fiber shown in FIG. 1c shows that the lead-in fiber supports a smaller number of modes than the transmission fiber, and that the guided modes of the lead-in fiber correspond to the useful portion of the transmission modes of the transmission fiber.

In accordance with the present invention, the transmission fiber is designed to support propagation of a significantly larger number of transmission modes than the lead-in fiber. Furthermore, the transmission fiber profile design preferably assures that the lead-in fiber selectively excites only a "useful" portion of the transmission modes 17, those modes of the transmission fiber corresponding to effective refractive indices in the core that are high relative to an effective refractive index in the cladding (see FIG. 1e). The highly selective excitation of those modes may be achieved through a proper transmission fiber profile design, where individual transversal field distributions of modes having high refractive index closely match individual mode field distributions of the lead-in fiber modes. This provides that no or only negligible optical power couples from the lead-in fiber into the transmission fiber modes having a low effective refractive index, artificially creating the same result as the gap 11 of FIG. 1b.

Furthermore, the design of the transmission fiber is preferably such as to maximize the effective refractive index of the excited modes relative to the refractive index of the fiber cladding (or of the optical layers adjacent to the core). This assures that the excited modes in the transmission fiber possess high effective indices and thereby high macro bend tolerance.

Figure 1E:
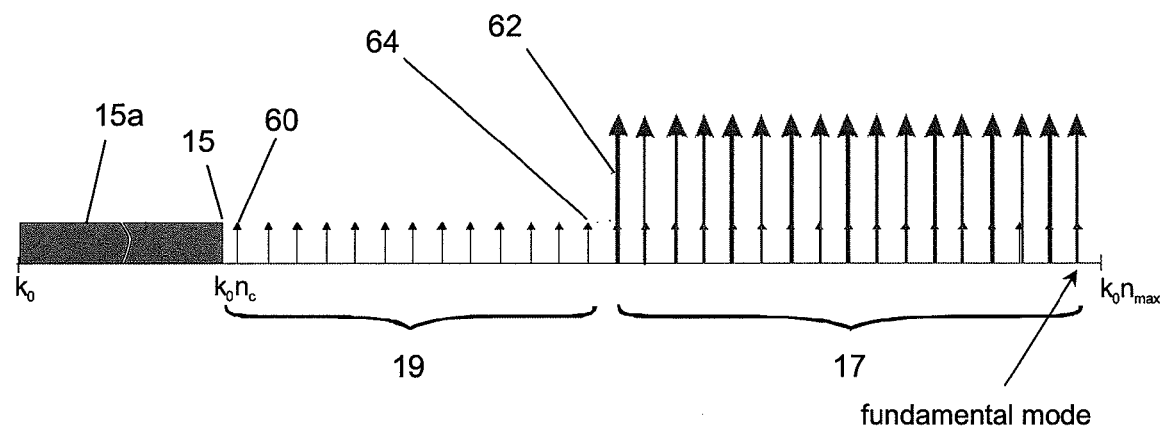
FIG. 1e is a diagram of the phase constant space of the modal structure and excitation in a bend-loss tolerant fiber transmission system.

Moreover, the highest order excited mode (or modal group) 62 of the transmission fiber, shown in FIG. 1e, may be considerably separated in phase constant space from the first unexcited mode (or modal group) of the transmission fiber 64, which prevents coupling among the excited and unexcited modes within the transmission fiber due to microbending (mode coupling events).

Referring to FIGS. 1e, 2d and 2f, the transmission fiber has a core 21 and a cladding 25 surrounding the core 21. The useful portion 17 of the transmission modes correspond to high effective refractive indices relative to a refractive index of the cladding 25. The transmission fiber 16 preferably has a refractive index profile, within the region of the core 21 of the transmission fiber 16 that is aligned with the core 27 of the lead-in fiber 14, which has a refractive index profile shape, i.e. a refractive index distribution in the radial direction, that matches the shape of a refractive index profile of the lead-in fiber 14.

The core 21 of the transmission fiber 16 may, as shown in FIGS. 2d and 2f, an have an inner region 23a, having a radius equal to or greater than the lead-in core radius, and an outer region 23b surrounding the inner region 23a for enhancing the excitation of the useful modes by the lead-in fiber. The inner region supports a substantial number of modes having effective refractive index values substantionally higher than a value of the refractive index of the cladding of the transmission fiber. The inner region 23a, which presents a core extension, can provide several functions. It can provide control over separation in phase constant space between excited and unexcited modes, confinement of higher order modes in a way that allows for better selective launch of desired modes (i.e. modal fields for modes with low $n_{eff}$ will have larger mode field diameter than modal fields for the "useful" modes characterized by high $n_{eff}$), and it can contribute to bandwidth improvement in the case of high performance telecom fibers. The inner region 23a has a transmission core refractive index profile that has a shape, i.e. refractive index distribution in the radial direction, relatively matching the excitation refractive index profile of the core 27 of the lead-in fiber 14 and absolute refractive index values higher than absolute refractive index values of the excitation refractive index profile. The outer region 23b may have a graded refractive index profile. The graded refractive index profile of the outer region 23b of the transmission core 21 may be truncated down to a refractive index of the transmission cladding refractive index profile to allow for effective practical production of fiber with the highest possible index difference between the core and the cladding which directly affects macrobend tolerance of the transmission fiber. It may have absolute refractive index values lower than absolute values of the lead-in cladding refractive index profile. Alternatively or additionally, it may be a continuation of the transmission core refractive index profile of the inner region 23a.

The transmission fiber cladding may have a region having absolute values of the refractive index lower than absolute values of the lead-in cladding refractive index, for providing additional separation between effective indices of excited modes and the index of the fiber cladding. For fiber production reasons and fiber spliceability reasons, the cladding might be however composed of two layers: an inner layer with low refractive index and an outer layer with the same refractive index as the lead in fiber.

Referring back to FIGS. 2a to 2d, the fiber transmission system 100 may also include an optical receiver 20 coupled to the transmission fiber 16. The optical receiver may include a lead-out fiber 18 spliced to the multimode transmission fiber 16 since this does not significantly increase the overall loss in the system, as shown in FIG. 2d. The lead-out fiber may consist of a section of standard or other appropriate multimode fiber.

Transmission Fiber Design

Figure 4:
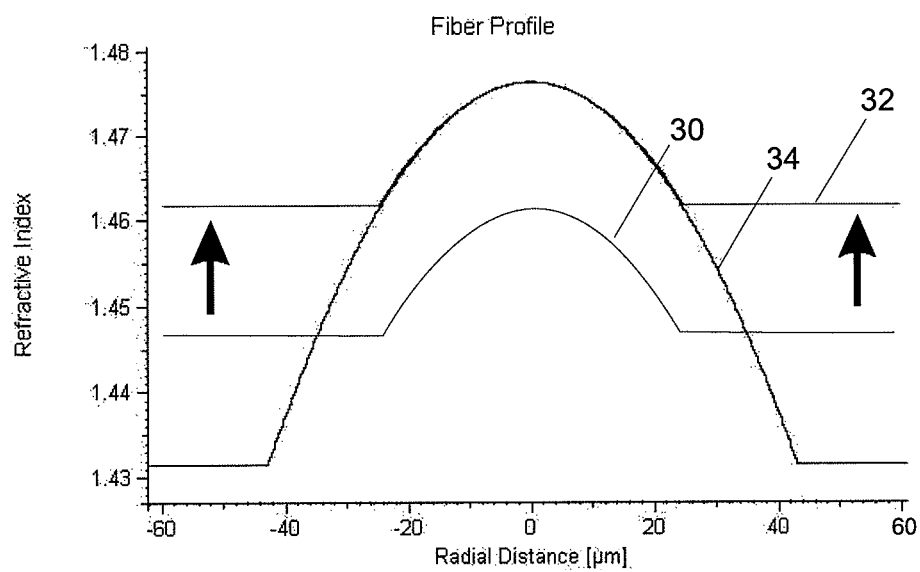
FIG. 4 is a graph of refractive index versus radial position used to obtain a multimode transmission fiber profile according to an embodiment of the present invention.
Figure 5:
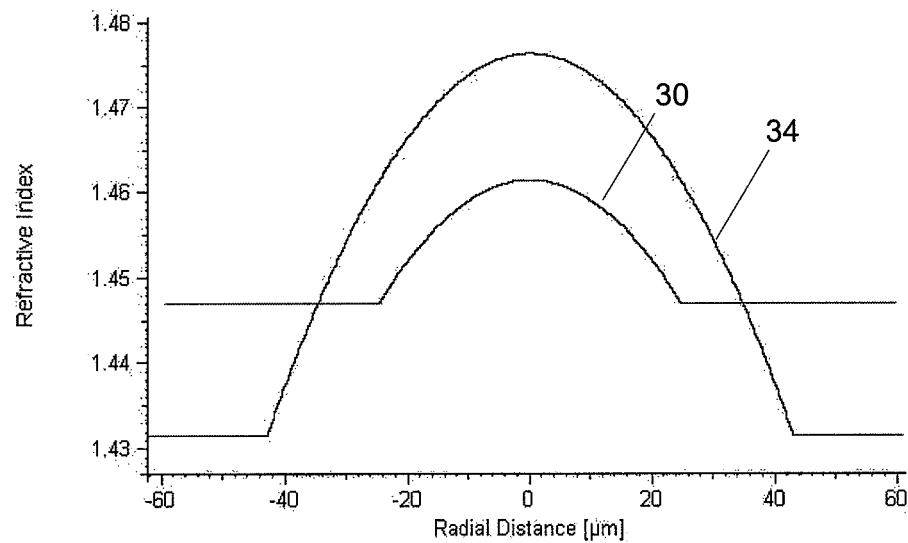
FIG. 5 is a graph of the refractive index versus radial position comparing a 50 µm standard multimode fiber profile with that of a nearly parabolic multimode transmission fiber profile.

In general, the core of the transmission fiber may have a graded refractive index profile. As explained earlier, a graded refractive index profile is one where the refractive index decreases with increasing radial distance from the fiber axis. According to one embodiment of the invention, the refractive index profile shape may be parabolic or nearly parabolic. FIGS. 4 and 5 show the parabolic or nearly parabolic profile 34 of a transmission fiber whose refractive index profile is tailored to match the refractive index profile 30 of a standard 50 µm telecommunication lead-in fiber, but that has a larger value of refractive index in the center of the core and a proportionally larger core diameter to match the lead-in and transmission fiber profile relative shape. The transmission fiber refractive index profile shape matches the lead-in fiber profile shape in the region corresponding to the lead-in fiber core size, except that the transmission fiber profile possesses overall higher refractive index than the lead-in core, e.g. it is shifted upwards in the refractive index domain.

The nearly parabolic (alpha profile) shaped core of the transmission fiber may also be truncated to simplify the manufacturing of transmission fiber and to allow for practical production of fiber with the highest possible index difference between the core and the cladding, which directly affects macrobend tolerance of the transmission fiber. The profile would therefore consist of a truncated nearly parabolic (a truncated alpha profile) core rather than a core having full alpha profile shape from the center to the core edge, as seen from truncated profile 38 of one embodiment depicted in FIGS. 6 and 7. The diameter of the truncated transmission fiber core should be however appropriate. The core should be large enough to maintain modal grouping and separation in phase constant space of the last excited and the first unexcited modal group. Otherwise, the fiber susceptibility to micro bending can become large as the distance in phase constant space between the excited and unexcited modes decreases significantly. Also, the excessive size of the core of the transmission fiber assures that the truncation of the core does not affect the group velocities of the highest-order excited modal group and thereby maintains low modal dispersion of excited modes. In case of standard telecommunication lead-in profile fibers, the truncated alpha profile core radius may be typically 1 to 10 μm larger than the lead-in fiber core radius. Actual selection of the size of the transmission fiber core depends on the desired microbend sensitivity and bandwidth requirements, wavelength and practically achievable index difference (total available numerical aperture).

Typically, the index profile of the transmission fiber core closely resembles the shape of the index profile of the lead-in graded index multimode fiber core (e.g. it has substantially similar alpha parameter as the standard 50 μm lead-in multimode fiber core), however the refractive index of the transmission fiber core center is typically larger than the refractive index in the core center of the standard 50 μm lead-in fiber, by about 1%. Furthermore, the refractive index of the cladding surrounding the truncated core is 1% lower than that of pure silica. This depressed cladding can, but need not, extend to the outer edge of the fiber. The diameter of the truncated core in a preferred embodiment is 5-10 μm larger than the lead-in fiber core diameter, and is about 55-65 μm in total.

In this particular embodiment, when the transmission fiber is excited by spliced, or otherwise interconnected, 50 μm standard GI-MMF, 10 turns of transmission fiber spooled on a cylinder having a diameter of 3 mm will cause optical losses of less than 0.5 dB at the wavelength of 850 nm.

A more detailed description of embodiments of the invention follows hereinbelow.

DETAILED DESCRIPTION OF EMBODIMENTS OF THE INVENTION

According to the embodiment of the present invention shown in FIG. 2c, the configuration of the bend tolerant system may consist of an optical source 12 coupled to standard multimode lead-in (excitation) fiber 14 that can be of any desired length and is in general not bend tolerant, followed by arbitrary length of multimode transmission fiber 16 that is bend resistive and can be subjected to severe bending and an optical detector or other optical receiver 20. At the other end of the transmission fiber, another section of standard fiber can optionally be added 18, as seen in the embodiment depicted in FIG. 2d. This is particularly useful if the system is used for bi-directional communication or if strict compatibility with standard fibers on both sides of fiber link is needed for any practical reason. As seen in FIG. 2d, a light source 12 is coupled to a multimode lead-in fiber 14. Multimode lead-in fiber is spliced to properly designed multimode transmission 16 fiber. Multimode transmission fiber is spliced to another section of multimode lead-out fiber 18. The lead-out fiber is coupled to the detector or other optical receiver 20. Lead-in and lead-out fibers may be the same type and may be, for example, of the standard telecommunication graded-index multimode fiber type. The multimode transmission fiber can be subjected to severe bending. In each case, if the transmission fiber is properly designed, the total insertion loss of the disclosed fiber transmission system can be significantly below 1 dB.

To achieve selective excitation of the high effective refractive index modes in the transmission fiber, the transmission fiber profile is tailored to the excitation fiber. Preferably, transversal distribution of electric field of each individual mode of the excitation fiber is matched with transversal electric field distribution of high refractive index mode of the transmission fiber. Each individual mode of excitation (lead-in fiber) has therefore a matching high effective index counterpart in the transmission fiber. Preferably, in an optimum case, the number of high effective index modes in the transmission fiber matches the total number of modes in the lead-in (excitation) fiber.

The transversal field distributions of lead-in (excitation) fiber modes and high index modes of transmission fiber may be matched by implementing the same relative refractive index profile shape in the transmission fiber as in the excitation fiber within the region that has the same radial dimensions as the lead-in (excitation) fiber core. However, to achieve high difference between effective refractive index of these modes and the cladding level, the absolute index values of the core, cladding or both shall be substantially different than in excitation fiber (e.g. the absolute core index shall be higher and/or the cladding index shall be lower than in the lead-in fiber).

Besides the high effective refractive index modes, the transmission fiber described above may also support propagation of other modes having lower values of effective refractive index that have reduced or even high bend loss sensitivity. Depending on the fiber profile, this set of modes can be large and is usually confined within large transversal area of transmission fiber core. Therefore the phase constant differences among those modes can be quite small resulting in high susceptibility of those modes to coupling by relatively mild microbending.

It is therefore advantageous to prevent coupling of these modes with the modes that are excited by the lead-in fiber (e.g. high effective refractive index modes), otherwise the optical power coupled in the transmission fiber can leak out from the fiber through combined micro- and macro-bend effects.

This may be achieved by proper design of the transmission fiber profile. Of particular importance is the shape of the transmission fiber refractive index profile immediately beyond the radial dimension that corresponds to the lead-in fiber radius. The profile having the gradient index preferably of parabolic or nearly parabolic shape can provide grouping of the modes in the phase constant space and thereby assure decent separation among last excited mode and first unexcited mode of the transmission fiber. This may be achieved if proper index gradient of the fiber profile is maintained in the region of the transmission fiber profile that lies behind radial dimension that corresponds to lead-in fiber core radius.

In general, the transmission fiber core profile therefore consists of two regions, as shown in FIGS. 2d and 2f. In the inner region 23a, the transmission fiber profile has the same relative shape as excitation (lead-in fiber) for the reasons that were discussed in previous paragraphs. In the outer region 23b (e.g. region beyond lead-in fiber core radius), the transmission fiber profile is graded, preferably parabolic or nearly parabolic. The gradient of this extended region is preferably sufficient to provide desired modal group separation in phase constant space to allow for desired fiber microbend tolerance.

Preferably and in accordance with present invention, where the lead-in fiber is one of the standard telecommunication fibers, the transmission fiber profile in the region from the core center up to the radius that corresponds to lead-in fiber radius consists of nearly parabolic profile of the same relative shape as standard telecommunication fiber, except that the absolute value of index profile is higher. Outside this region, the transmission fiber profile is extended and is preferably a continuation of inner region, i.e. continuation of the graded profile that extends from center of the fiber up to the radius that corresponds to lead in fiber core diameter.

In the latter case, modes in extended region continue to be grouped in modal groups that are separated in phase constant space by the same amount as in the lead-in fiber core. Since this separation is quite substantial in telecommunication fibers, such design provides low mode coupling caused by moderate microbending. The maximum size of this extended graded region is not limited and can range up to the fiber edge. However available production process and maximum achievable refractive index difference (e.g. restrictions in doping of the silica fiber) limits the size of this region and determines the maximum size of the transmission fiber core. Furthermore, in order to simplify the production process and to allow for even greater achievable refractive index difference between the core and the surrounding cladding region, the size of the extended graded region can be reduced or truncated. This forms step transition in the refractive index profile of the transmission fiber. The minimum required size of the graded core extension 36 (shown in FIG. 6) depends on desired microbend tolerance of the transmission fiber, transmission fiber outer diameter, operating wavelength and lead-in (excitation) fiber profile parameters. In most practical cases, the radial dimension of graded index core extension 36 ranges between 0 and 10 µm. Finally, the transmission fiber core is surrounded by cladding. The cladding may be preferably depressed by, for example, fluorine doping to achieve additional separation between effective indices of excited modes and the index of the fiber cladding. The depressed region can extend to the outer edge of the fiber. When cladding depression is used, the depressed region does not need to extend up to the outer edge of the fiber. The outermost part of the cladding can also be pure silica. The size of the depressed region shall be sufficient so that the undoped region does not influence the waveguide properties of the transmission fiber core in a way that can reduce bend tolerance of the transmission fiber. Placing pure silica at the outer side of the fiber can be advantageous from the cost and production process perspective as well as for chemical and mechanical properties of the fiber. Furthermore, when a transmission fiber with small outer diameter is preferred, fiber coating with low refractive index can be applied to further improve bend loss performance.

Although the following description is provided with reference to an embodiment of the bend resistant multimode fiber transmission system of the present invention that is compatible with standard telecommunication 50 µm multimode fiber, it should be noted and obvious that this is not meant to limit the invention to such an embodiment and that variations of the presented embodiment are possible that will provide similar performance. In particular the present concept could be applied to plastic optical fibers.

Figure 3:
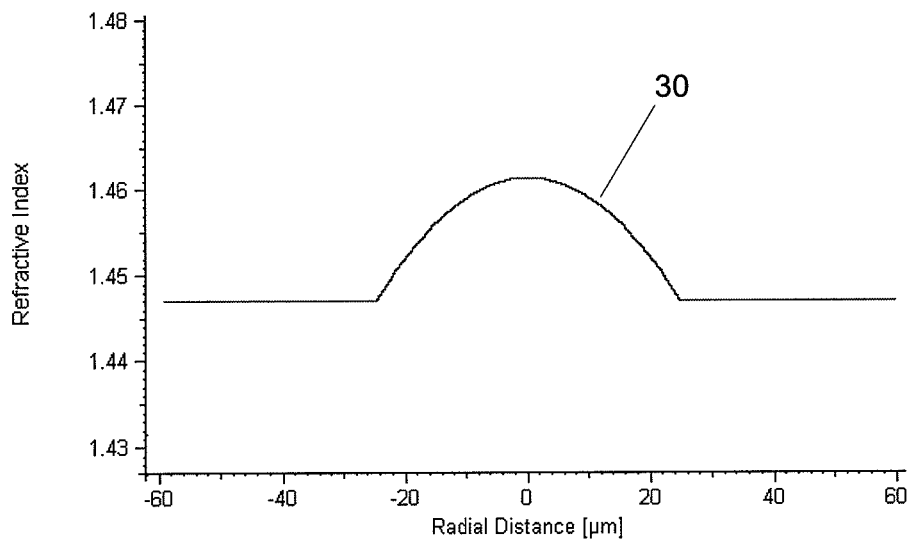
FIG. 3 is a graph of refractive index versus radial position for a standard multimode 50 µm fiber at 1300 nm.

FIG. 3 shows a typical profile 30 of standard 50 µm core telecommunication graded index multimode fiber at 1300 nm. The refractive index in the core center is typical around 1.4615. The cladding is made of pure silica with refractive index of about 1.4469 at 1300 nm. The relative difference between core and the cladding is about 1%. The profile shape is nearly parabolic and is usually optimized according to exact fiber composition and target operating wavelength to minimize modal group delay and thereby maximize the fiber bandwidth.

The transmission fiber profile is tailored to a standard telecommunication 50 µm fiber using the following steps. The maximum practical achievable refractive index difference is first determined. When germanium doping of silica is used, this value lies around 1.4763 which corresponds to about 2% relative difference compared to the pure silica level (higher index is also possible with germanium doping, but the production process difficulties and build up of the stress in the fiber makes higher doping level less convenient for practical fiber production). The 50 µm standard telecommunication multimode fiber profile, shown in FIG. 3, is used as a template for determination of transmission fiber profile shape in the region between fiber center and radial distance of 25 µm (e.g. in the area that corresponds to 50 µm multimode fiber core). To obtain the desired profile shape of the transmission fiber, the original 50 µm multimode fiber profile in FIG. 3 is shifted upwards until the core center reaches maximum practical refractive index value (in our particular design example we chose this as 1.4763). In the area that is larger than lead-in core size, e.g. in the area beyond 25 µm measured from the fiber core center, the refractive index profile shape is continuation of graded (nearly parabolic) profile that extends between 0 and 25 µm. The profile extension should be as large as possible, e.g. until the lowest practical value of refractive index is achieved. If fluorine doping is used, typical relative index difference −0.5% is achievable by most available fiber production processes. Some processes, like plasma assisted vapor deposition, allow even higher fluorine doping levels that can yield relative refractive indices below −1% when compared to pure silica level.

While the application of fluorine doping in the cladding and $GeO_2$ doping in the core is most likely optimal in terms of fiber absorption losses, in applications where small to moderate increase of absorption losses is not of prime concern, $B_2O_3$ or combination of $B_2O_3$ and fluorine can be also used for reduction of the cladding index of refraction.

Furthermore the refractive index of the core can be increased by more than 2% above the refractive index of pure silica by using $TiO_2$ or combination of $TiO_2$ with $GeO_2$. It is known that $TiO_2$ doping of silica reduces the coefficient of thermal expansion and related stress build up. Thereby combined $TiO_2$ and $GeO_2$ doping can lead to significantly higher maximum achievable indexes of refraction as found in common silica fibers. $P_2O_5$ can also be used as a dopant to additionally increase the refractive index and reduce the processing temperature during fiber preform production and therefore assist in the production process. Combinations of the above-mentioned dopants are also possible to shape and achieve high contrast refractive index profiles of desired shapes. Of course, any other appropriate dopants may also be used to obtain high contrast refractive index profiles of desired shapes.

FIG. 4 depicts a graphical design procedure used for obtaining a multimode transmission fiber profile. The chosen lead-in fiber for this particular design example is a standard 50 µm multimode fiber. The refractive index of the standard 50 µm fiber profile 30 is increased, e.g. shifted upward 32, until the practical production limit for the refractive index in the core center is reached. The transmission fiber profile 34 is obtained by taking the shape of the upwardly shifted standard telecommunication 50 µm fiber profile 32 as a template for determination of the transmission fiber profile shape in the region from the fiber core center and the radial position that corresponds to the standard 50 µm fiber core (e.g. to the radius of 25 µm). The transmission fiber profile 34 outside the region that corresponds to 50 µm fiber core size is continuation of nearly parabolic profile near the core center. The refractive index profile is extended until practical production limit for minimum obtainable refractive index of the cladding is reached.

FIG. 5 shows a comparison of a 50 µm standard multimode fiber profile 30 and an example design of a nearly parabolic multimode transmission fiber profile 34.

Figure 6:
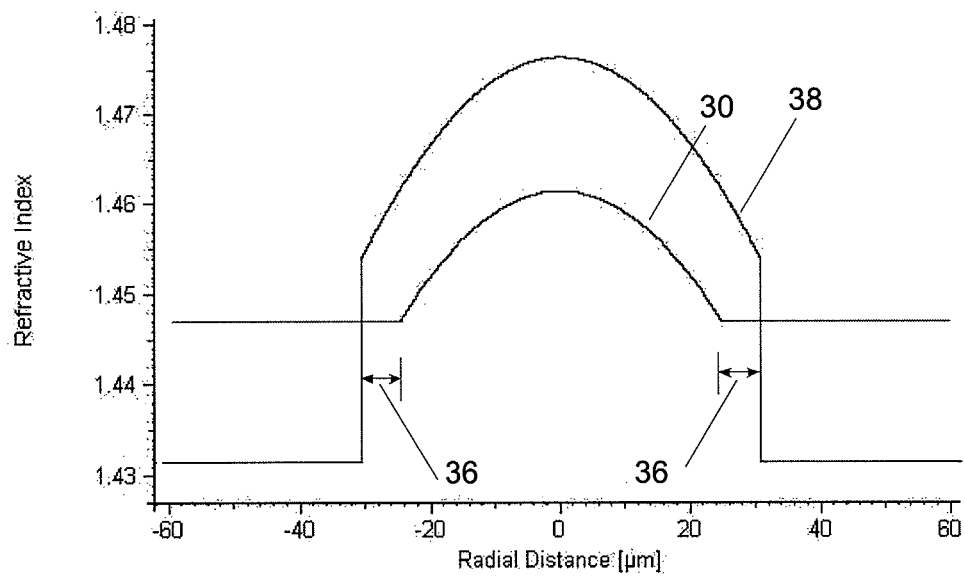
FIG. 6 is a graph of refractive index versus radial position, showing a 50 µm standard multimode fiber profile and a truncated nearly parabolic transmission fiber profile.
Figure 7:
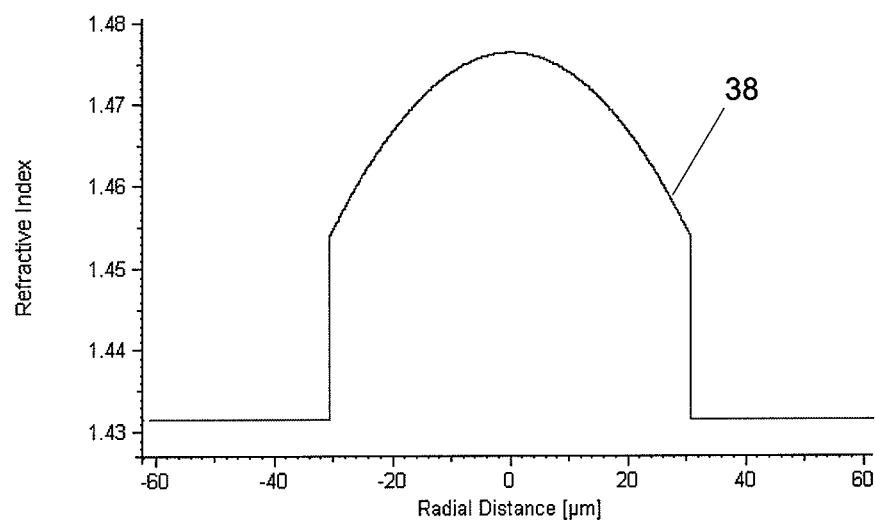
FIG. 7 is a graph of refractive index versus radial position, depicting a transmission fiber profile that is compatible with standard 50 µm multimode fibers.
Figure 8:
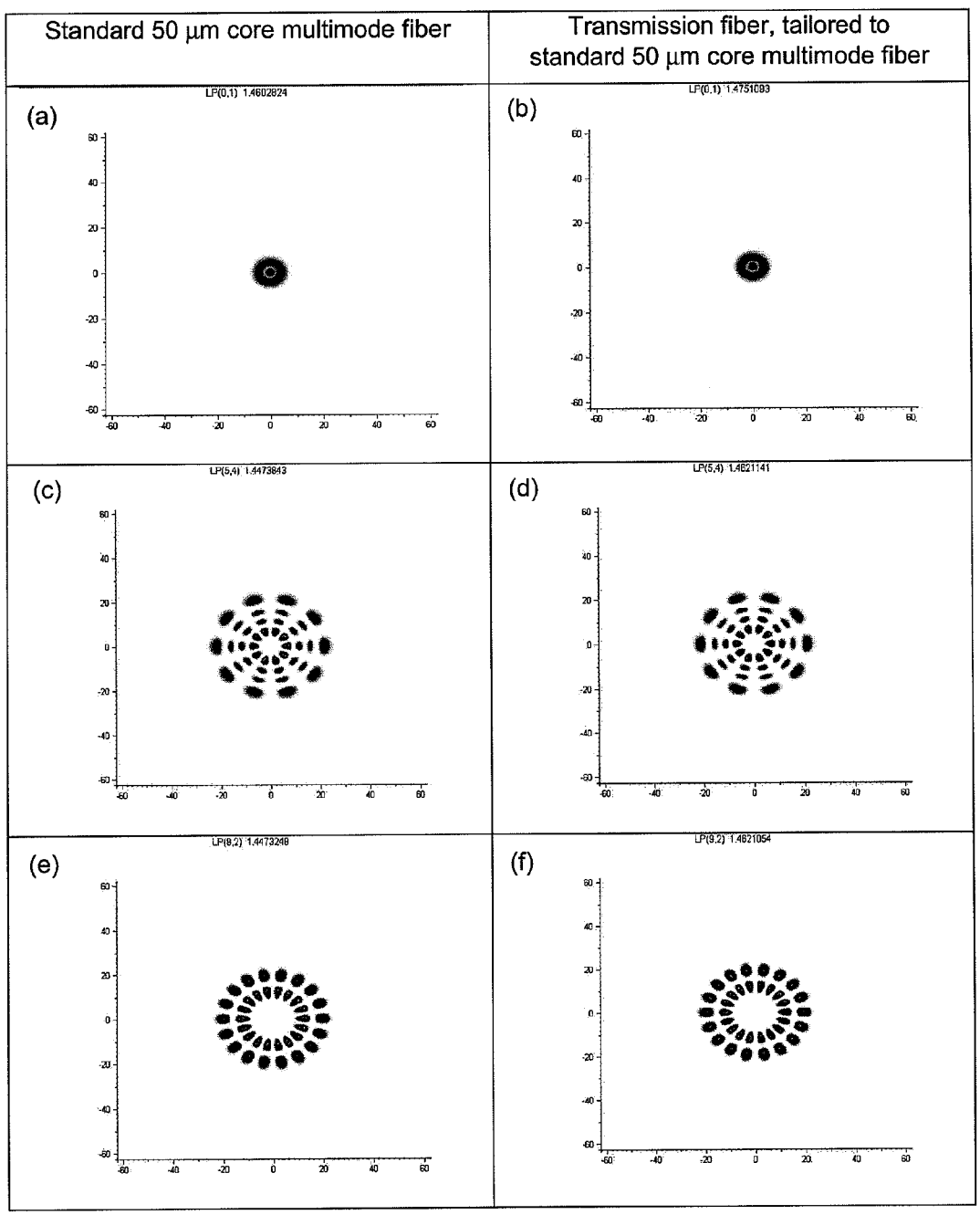
FIG. 8a depicts an example of a plot of intensity distribution in the transversal plane for mode LP(0,1) for a standard 50 µm multimode fiber with the refractive index profile shown in the FIG. 7.
FIG. 8b depicts an example of a plot of intensity distribution in the transversal plane for mode LP(0,1) for a transmission fiber with the refractive index profile shown in the FIG. 7.
FIG. 8c depicts an example of a plot of intensity distribution in the transversal plane for mode LP(5,4) for a standard 50 µm multimode fiber with the refractive index profile shown in the FIG. 7.
FIG. 8d depicts an example of a plot of intensity distribution in the transversal plane for mode LP(5,4) for a transmission fiber with the refractive index profile shown in the FIG. 7.
FIG. 8e depicts an example of a plot of intensity distribution in the transversal plane for mode LP(9,2) for a standard 50 µm multimode fiber with the refractive index profile shown in the FIG. 7.
FIG. 8f depicts an example of a plot of intensity distribution in the transversal plane for mode LP(9,2) for a transmission fiber with the refractive index profile shown in the FIG. 7.

The exemplary refractive index profile 34 in FIGS. 4 and 5 assumes that an index difference relative to silica level of −1% can be achieved in practice. While such a profile would already provide high bend tolerance of the fiber, the fiber core would be large (over 80 µm) which is impractical for several reasons. First, very large doped area requires longer and more expensive production process. A graded index core that extends below refractive index of pure silica would require a good control of the fluorine doping process that is in general more difficult to achieve than with other commonly used dopants. Second, in many instances, the fiber diameter may itself be 80 µm or less to allow better long term survivability of the fiber when exposed to high stress induced by bending. Since the entire profile does not need to be graded (nearly parabolic), but only the limited fraction beyond the excitation fiber core size, the transmission fiber profile can be truncated. In the example design presented in FIG. 6, this truncation is performed at radial position that corresponds to approximately 32.5 µm (e.g the truncated core size is approximately 65 µm). FIG. 6 shows a 50 µm standard multimode fiber profile 30 and a truncated nearly parabolic transmission fiber profile 38, where the core of the parabolic transmission profile is truncated to the cladding level at the radial distance that is larger by a distance 36 than the core radius of standard 50 µm multimode lead-in fiber. A final practical transmission profile design is shown in FIG. 7, having a truncated graded index core with diameter of about 65 µm. The graded core extension 36 is by 15 µm larger than initial 50 µm core diameter. The cladding surrounding the core has refractive index of about 1.4315, which is about −1% below silica level. In this particular design the graded region may be only germanium doped within easily achievable manufacturing doping level limits, while the cladding is strongly fluorinated. Such combination is very convenient for practical fiber production.

The presented transmission fiber design provides a set of modes that closely match transversal mode field distributions of the propagating modes of standard 50 µm multimode fiber. As an example, FIGS. 8a to 8f show computed transversal intensity distribution for modes LP(0,1), LP(5,4) and LP(9,2) in a transmission fiber design with a refractive index profile as shown in FIG. 7 and a standard 50 µm multimode fiber. FIGS. 8a to 8f clearly show practically identical transversal mode field distribution in both fibers. When standard 50 µm fiber is spliced to the transmission fiber, the lowest order mode of the 50 µm standard fiber excites the lowest order mode in the transmission fiber. The same applies for the other higher order modes of the 50 µm standard fiber that selectively excite their counterparts in the transmission fiber. Since the number of modes supported by standard 50 µm fiber is considerably lower than in the transmission fiber, only the limited set of modes having the highest effective indices is excited in transmission fiber. High values of effective indices consequently provide high bend tolerance of the excited modes.

Figure 9:
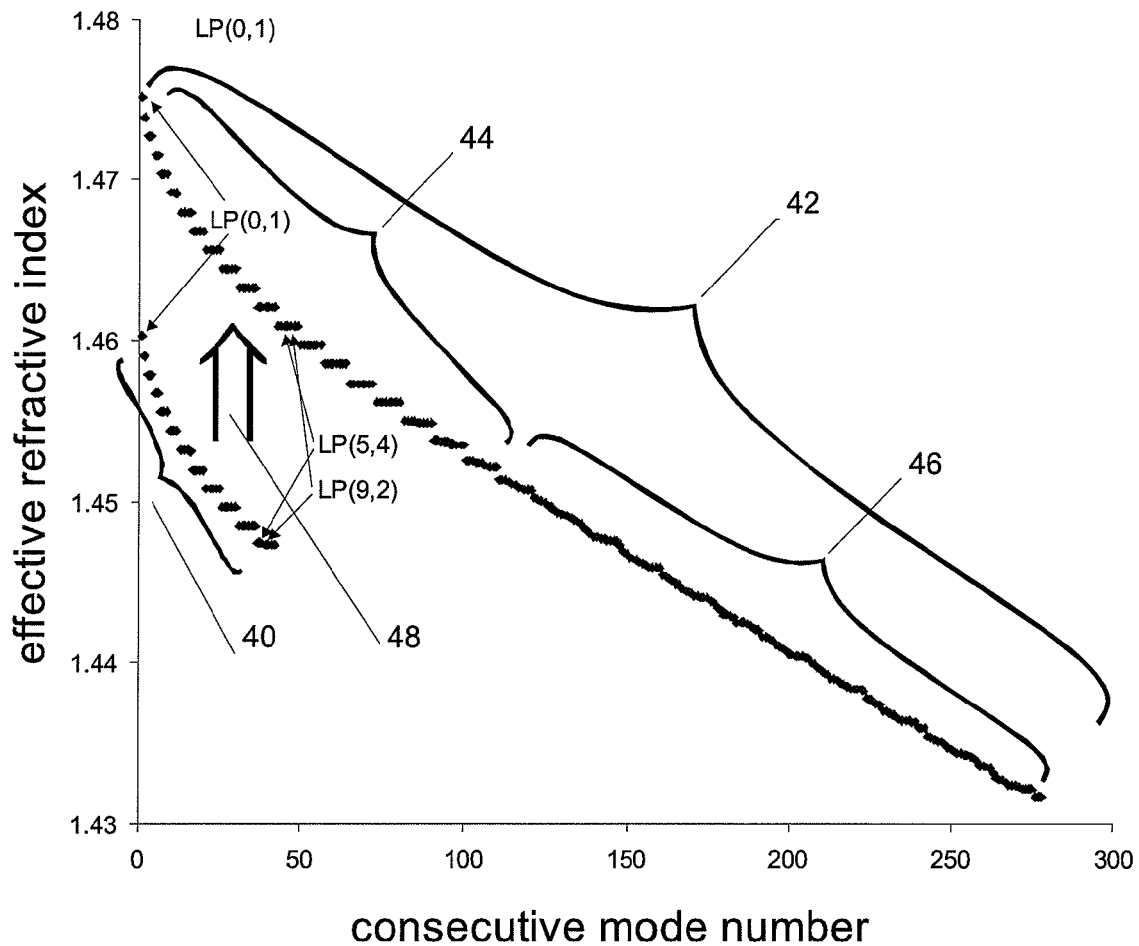
FIG. 9 is a graph of effective refractive index versus consecutive mode number (modes are ordered according to their effective index) for propagating modes in a transmission fiber having a profile as shown in FIG. 7 and in a standard 50 µm multimode fiber. Each dot in the graph presents one linearly polarized (LP) mode of the fiber.

FIG. 9 shows values of effective refractive indices of the propagating modes in both transmission fiber having a profile as shown in FIG. 7 and a standard 50 µm fiber. Modes belonging to standard 50 µm multimode fiber are indicated by parenthesis 40 and modes belonging to transmission fiber are marked by parenthesis 42. Each dot in the graph presents one LP mode, for example dots presenting modes LP(0,1), LP(5, 4) and LP(9,2), are more precisely indicated in the figure for both fibers by arrows. Parenthesis 44 indicates modes of the transmission fiber that are grouped in modal groups that are well separated in the effective refractive index domain. The mode coupling between these separated modal groups is less likely. Parenthesis 46 indicates modes of the transmission fiber that are close to one another in the effective refractive index domain. Small spacing in refractive domain among these modes makes coupling of the modes more likely. Arrow 48 also indicates the conversion of modes when standard 50 µm multimode fiber is spliced to transmission fiber.

Since the standard 50 µm fiber selectively excites only the lowest order set of modes in the transmission fiber and since the extended size of nearly parabolic core in the transmission fiber maintains modal grouping and separation in effective refractive index domain, the last excited modal group is well separated in refractive index domain from the first unexcited mode (modal group) of the transmission fiber. This effectively prevents significant optical power exchange from excited to unexcited modes in the transmission fiber caused by mode coupling due to the microbending. Furthermore, since the excited modes are confined and guided in the nearly parabolic region, their modal group velocities are well balanced and the presented profile design can provide bandwidth similar to standard telecommunication fibers.

Figure 10:
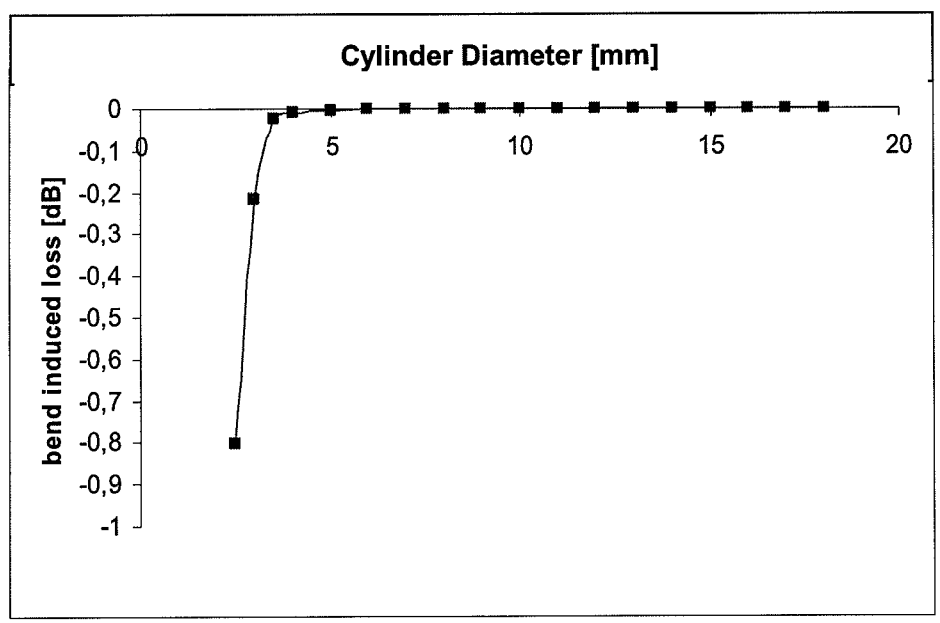
FIG. 10 is a graph of bend induced loss versus cylinder diameter showing experimentally measured performance of a multimode bend resistant system according to an embodiment of the present invention.
Figure 11:
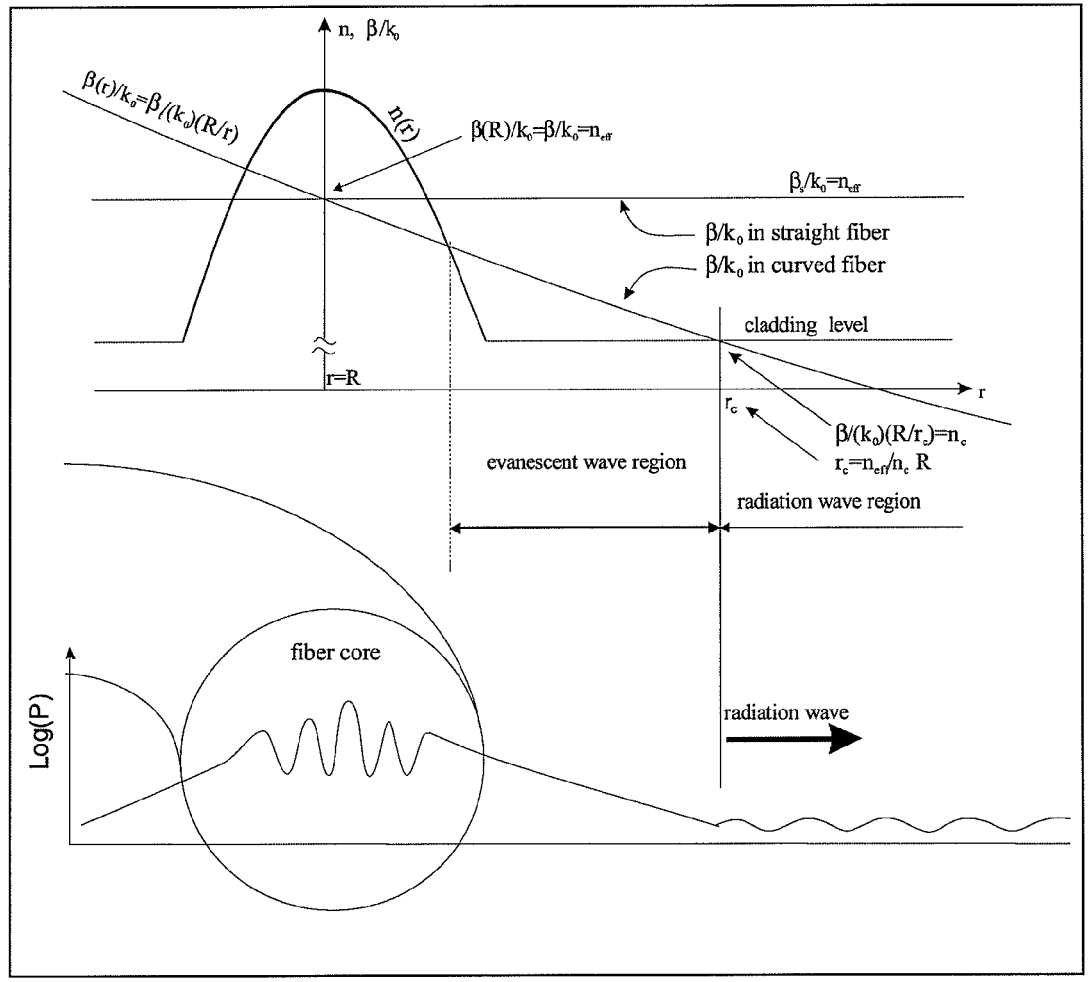
FIG. 11 is a graphical representation of bend loss of a mode in a curved fiber.

FIG. 10 shows typical experimentally measured performance of a bend resistant, i.e. bend-tolerant, multimode transmission system. It shows the measured bend loss obtained when 10 loops of the transmission fiber was wrapped around cylinders with different diameters. The configuration of the bend resistant system corresponds to the case where standard 50 µm multimode fiber was spliced both at the inlet and the exit of the transmission fiber as shown in FIG. 2d. The transmission fiber profile corresponded to the profile shown in FIG. 7 with small deviations caused by fiber production imperfections. When a 850 nm LED source was used as a light source, 10 loops of the transmission fiber wrapped on a 3 mm diameter cylinder produced bend loss that was less than −0.3 dB, while 10 loops of transmission fiber wrapped around 4 mm cylinder produced loss that was less than −0.05 dB.

Figure 12:
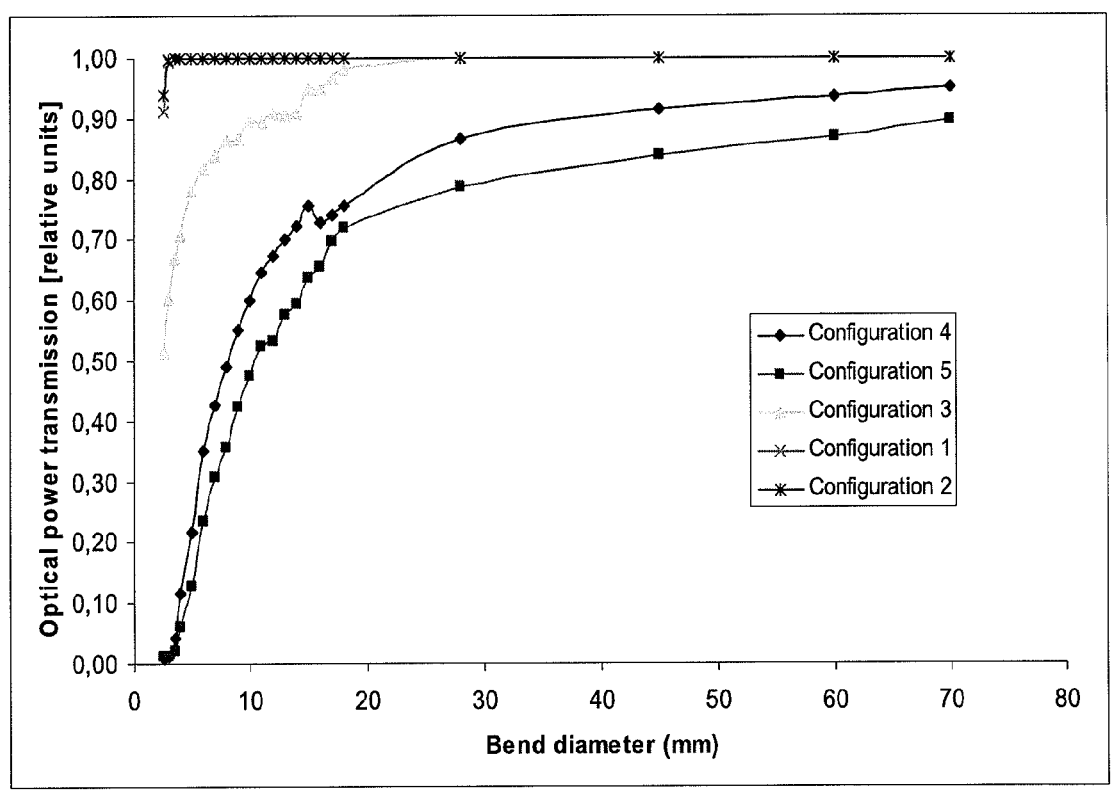
FIG. 12 is a graph of relative optical power transmission versus bend diameter for various configurations of transmission systems.
Figure 13:
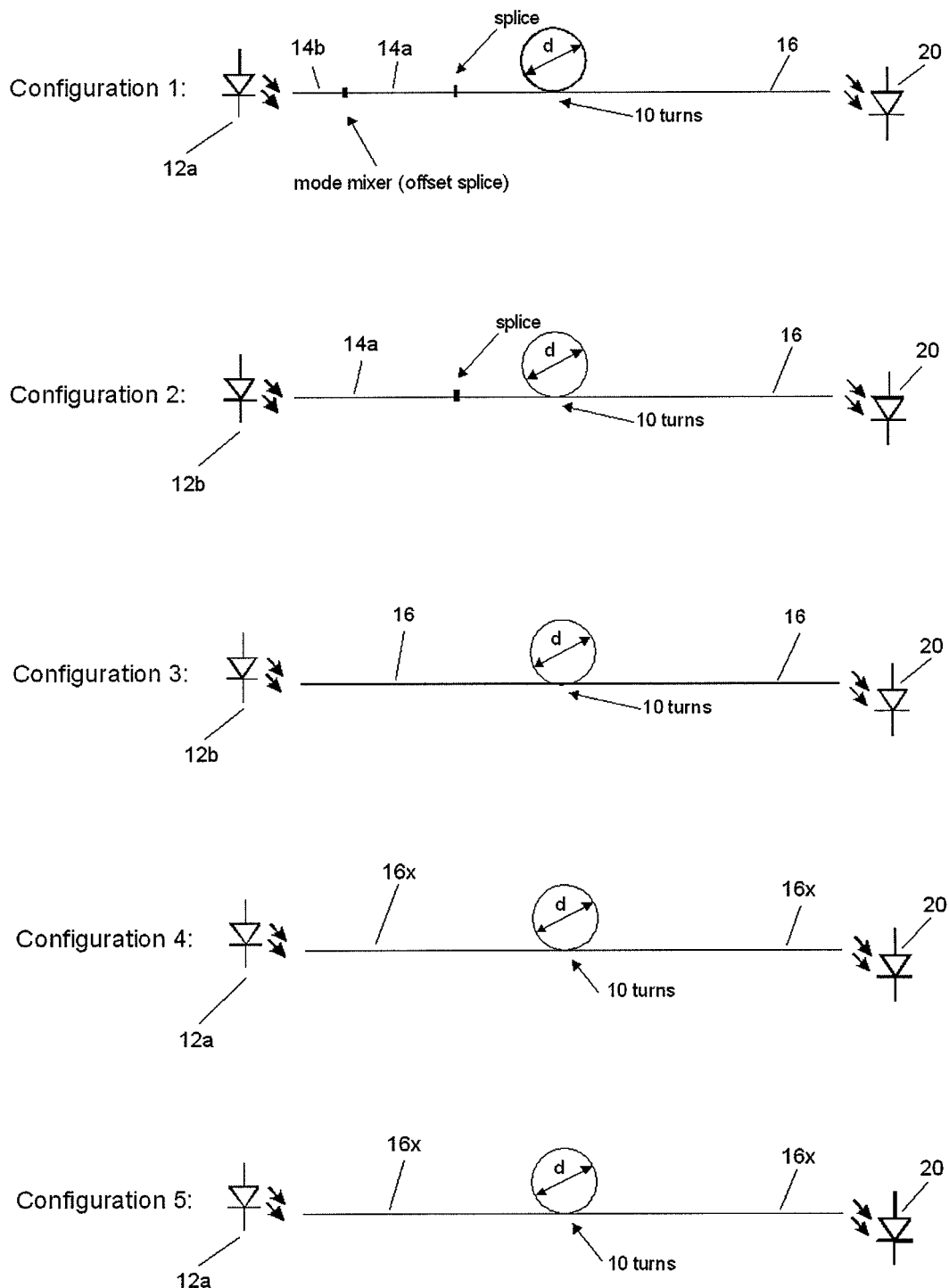
FIG. 13 is a schematic representation of the various configurations of FIG. 12, configurations 1 to 5.

FIG. 12 shows the improved bend-loss resistance for a bend-loss tolerant multimode fiber transmission system according to the present invention. Macrobend performance of the proposed system was tested in several experimental configurations, configurations 1 to 5, shown in FIG. 13.

In Configuration 1, an LED source (12a) operating at 850 nm was coupled first to a short piece of standard 50 µm GI-MMF (14b). Another section of lead-in fiber, here a standard 50 µm GI-MMF (14a), was spliced to the first 50 µm GI-MMF, but the splice was performed at a 20 µm offset relative to both fiber axes. This assured that all the modes of the second section of the standard 50 µm GI-MMF were launched (e.g. fiber was in a rich overfilled launch). The experimental transmission fiber 16 was then spliced to the second section of 50 µm GI-MMF (14a). Another end of transmission fiber was coupled to a detector or receiver 20 (in this case a power meter). Ten (10) loops, or turns, of transmission fiber were then wrapped on cylinders with various diameters. The relative decrease in transmission due to the fiber bending was measured and reported in FIG. 12; the transmission was calculated as the ratio between output power in wrapped and straight transmission fiber. This configuration can be considered as a worst case example as it provides strong excitation of the highest order modes in the lead in fiber.

Configuration 2 is similar and it uses a 850-nm Vertical Cavity Surface Emitting Laser (VCSEL) source (12b) intended for gigabit transmission standard 50 μm GI-MMF. This type of laser will more preferentially excite lower and medium order modes of 50 μm GI-MMF. The VCSEL was first connected to short section of lead-in fiber, here standard 50 μm GI-MMF (14a), that was spliced to transmission fiber 16. No mode mixing was performed. The transmission fiber was exposed to bend loss test using cylinders as described in case of configuration 1.

In Configuration 3, VCSEL source (12b) intended for gigabit transmission in standard 50 μm GI-MMF is directly coupled to transmission fiber 16 (coupling was achieved by using VCSEL having ST receptacle and the transmission fiber having ST connector on one side). Again, the bend loss was measured in the same way as described for the configurations above.

Configurations 4 and 5 are most typical configurations found in common telecommunication practice. Configuration 4 uses an 850-nm LED source (12a) coupled to a standard 50 μm GI-MMF (16x) to assure an overfilled mode launch in the standard fiber, while Configuration 5 uses 850-nm VCSEL source (12b) intended for a gigabit transmission coupled to a standard 50 μm GI-MMF (16x). In both cases, bend loss was measured by bending standard 50 μm GI-MMF in the same way as in Configurations 1 to 3. Configurations 4 and 5 are provided for reference and comparison purposes to demonstrate the practical capability of the presented invention.

Measurement results for all five configurations are shown in FIG. 12. FIG. 12 demonstrates by far superior bend loss performance of configurations 1 and 2 over currently used systems represented by configurations 4 and 5. It is also worth to compare results obtained in configurations 4 and 5 and to observe that restricted mode launch achieved by gigabit transmission compatible VCSEL (IEEE 802.ae standard compatible) only marginally improved bend loss performance of standard 50 μm GI-MMF. However results obtained in configuration 3 show that the same VCSEL can be used to selectively launch predominately the modes that are bend-resistant in presented transmission fiber thus immediately providing significant bend loss performance. It is likely that minor optimization of VCSEL design could lead to resolute very close to launching by 50 μm GI-MMF.

Of course, the present invention is not to be interpreted as limited to the embodiments described above. For example, the presented invention could be applied to any appropriate optical fibers, including plastic optical fibers. Numerous modifications could be made to the embodiments described above without departing from the scope of the present invention.

The invention claimed is:

1. A bend-loss tolerant multimode fiber transmission system, comprising:
   a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, which corresponds to more than 50% of the number of modes found in standard 50 μm multimode fiber; and
   a mode-launching system for selectively exciting the transmission modes of the transmission fiber belonging only to said useful portion.

2. A bend-loss tolerant multimode fiber transmission system, comprising:
   a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, which corresponds to more than about 30 modes; and
   a mode-launching system for selectively exciting the transmission modes of the transmission fiber belonging only to said useful portion.

3. A bend-loss tolerant multimode fiber transmission system, comprising:
   a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, which comprises modes having a mode field diameter equal to or greater than one half a diameter of the core; and
   a mode-launching system for selectively exciting the transmission modes of the transmission fiber belonging only to said useful portion.

4. A bend-loss tolerant multimode fiber transmission system, comprising:
   a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein the transmission modes of the transmission fiber belonging only to said useful portion are excited by a launching spot equal to or greater than 30 μm; and
   a mode-launching system for selectively exciting the transmission modes of the transmission fiber belonging only to said useful portion.

5. The bend-loss tolerant multimode fiber transmission system according to claim 1, wherein a lowest order mode of said transmission modes of the transmission fiber belonging only to said useful portion and a highest order mode thereof have a difference in effective refractive index that is equal to or greater than 0.007.

6. The bend-loss tolerant multimode fiber transmission system according to claim 1, wherein said substantial number of modes have characteristics of multimode transmission fibers.

7. A bend-loss tolerant multimode fiber transmission system, comprising:
   a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein the transmission modes of the transmission fiber belonging only to said useful portion propagate in a region of the core that has a diameter equal to or greater than ⅔ a diameter of a core of a standard multimode fiber; and a mode-launching system for selectively exciting the transmission modes of the transmission fiber belonging only to said useful portion.

8. A bend-loss tolerant multimode fiber transmission system, comprising:

a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, which correspond to modes of multimode fibers having a core diameter equal to or greater than 25 μm and a numerical aperture equal to or greater than 0.15; and a mode-launching system for selectively exciting the transmission modes of the transmission fiber belonging only to said useful portion.

9. The bend-loss tolerant multimode fiber transmission system according to claim 1, wherein the mode-launching system comprises an optical source.

10. The bend-loss tolerant multimode fiber transmission system according to claim 1, wherein the mode-launching system comprises a lead-in fiber coupled to said transmission fiber, said lead-in fiber having a core and a cladding surrounding said core, the lead-in fiber supporting, for light within said target spectral range, a number of lead-in modes substantially corresponding to the number of transmission modes in the useful portion of the group of transmission modes of the transmission fiber.

11. The bend-loss tolerant multimode fiber transmission system according to claim 10, wherein the transmission fiber has a refractive index profile, within a region of the core thereof aligned with the core of the lead-in fiber, which has a shape that matches a refractive index profile shape in the core of the lead-in fiber.

12. The bend-loss tolerant multimode fiber transmission system according to claim 1, wherein the core of the transmission fiber has a graded refractive index profile.

13. The bend-loss tolerant multimode fiber transmission system according to claim 12, wherein said refractive index profile shape is parabolic or nearly parabolic.

14. The bend-loss tolerant multimode fiber transmission system according to claim 13, wherein the refractive index radial profile shape is truncated.

15. The bend-loss tolerant multimode fiber transmission system according to claim 10, wherein the lead-in fiber comprises a standard telecommunication multimode fiber.

16. The bend-loss tolerant multimode fiber transmission system according to claim 1, comprising an optical receiver coupled to the transmission fiber.

17. The bend-loss tolerant multimode fiber transmission system according to claim 16, wherein the optical receiver is coupled to the transmission fiber via a multimode lead-out fiber spliced to the multimode transmission fiber.

18. A bend-loss tolerant multimode fiber transmission system, comprising:

a transmission fiber having a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes; and a mode-launching system for selectively exciting the transmission modes of the transmission fiber belonging only to said useful portion, wherein:

the mode-launching system comprises a lead-in fiber coupled to said transmission fiber, said lead-in fiber comprising:

a core having a given lead-in core radius and a given excitation refractive index profile for exciting said transmission modes of the transmission fiber belonging only to said useful portion; and a cladding surrounding said core and having a given lead-in cladding refractive index profile;

the core of the transmission fiber comprises:

an inner region having a radius equal to or greater than the lead-in core radius and having a transmission core refractive index profile that has a shape that relatively matches the excitation refractive index profile of the core of the lead-in fiber and absolute refractive index values higher than absolute refractive index values of the excitation refractive index profile; and an outer region surrounding the inner region and having a graded refractive index profile; and the cladding of the transmission fiber has a transmission cladding refractive index profile.

19. The bend-loss tolerant multimode fiber transmission system according to claim 18, wherein the graded refractive index profile of the outer region of the core of the transmission fiber is truncated down to a refractive index of the transmission cladding refractive index profile.

20. The bend-loss tolerant multimode fiber transmission system according to claim 18, wherein the graded refractive index profile of said outer region has absolute refractive index values lower than absolute values of the lead-in cladding refractive index profile.

21. The bend-loss tolerant multimode fiber transmission system according to claim 18, wherein the cladding of the transmission fiber comprises a region having absolute values of the transmission cladding refractive index profile that are lower than absolute values of the lead-in cladding refractive index profile.

22. The bend-loss tolerant multimode fiber transmission system according to claim 18, wherein the cladding of the transmission fiber comprises an outer region that is undoped.

23. The bend-loss tolerant multimode fiber transmission system according to claim 18, wherein the lead-in fiber comprises a standard telecommunication multimode fiber.

24. The bend-loss tolerant multimode fiber transmission system according to claim 18, wherein the shape of the transmission core refractive index profile of the inner region is nearly parabolic.

25. The bend-loss tolerant multimode fiber transmission system according to claim 18, wherein the graded refractive index profile of the outer region of the core of the transmission fiber comprises a continuation of the transmission core refractive index profile of the inner region, said graded refractive index profile of the outer region of the core of the transmission fiber ultimately reaching a refractive index of the transmission cladding refractive index profile.

26. The bend-loss tolerant multimode fiber transmission system according to claim 25, wherein the graded refractive index profile of the outer region of the transmission core is truncated.

27. The bend-loss tolerant multimode fiber transmission system according to claim 26, wherein the graded refractive index profile of the outer region of the core of the transmission fiber is truncated down to a refractive index of the transmission cladding refractive index profile.

28. A transmission fiber of a bend-loss tolerant multimode fiber transmission system for light propagating in standard multimode fiber modes, said transmission fiber comprising a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein said substantial number of modes corresponds to more than 50% of the number of modes found in standard 50 μm multimode fiber.

29. The transmission fiber according to claim 28, wherein the core of the transmission fiber has a graded refractive index profile.

30. The transmission fiber according to claim 29, wherein said refractive index profile shape is parabolic or nearly parabolic.

31. The transmission fiber according to claim 29, wherein the refractive index radial profile shape is truncated, thereby defining a step transition between said refractive index profile of the outer region and the refractive index of the transmission cladding refractive index profile.

32. The transmission fiber according to claim 28, wherein
the cladding of the transmission fiber has a transmission cladding refractive index profile; and
the core of the transmission fiber comprises:
an inner region supporting said substantial number of modes that have effective refractive index values substantially higher than a refractive index value of the cladding of the transmission fiber; and
an outer region surrounding the inner region.

33. The transmission fiber according to claim 32, wherein the outer region of the core of the transmission fiber has a graded refractive index profile that is truncated down to a refractive index of the transmission cladding refractive index profile.

34. The transmission fiber according to claim 32, wherein the outer region of the core of the transmission fiber has a graded refractive index profile that comprises a continuation of a refractive index profile of the inner region, said graded refractive index profile of the outer region of the core of the transmission fiber ultimately reaching a refractive index of the transmission cladding refractive index profile.

35. A transmission fiber of a bend-loss tolerant multimode fiber transmission system for light propagating in standard multimode fiber modes, said transmission fiber comprising a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein said substantial number of modes corresponds to more than about 30 modes.

36. A transmission fiber of a bend-loss tolerant multimode fiber transmission system for light propagating in standard multimode fiber modes, said transmission fiber comprising a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein said substantial number of modes comprises modes having a mode field diameter equal to or greater than one half a diameter of the core.

37. A transmission fiber of a bend-loss tolerant multimode fiber transmission system for light propagating in standard multimode fiber modes, said transmission fiber comprising a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein said useful portion of said transmission modes is excited by a launching spot equal to or greater than 30 μm.

38. The transmission fiber according to claim 28, wherein a lowest order mode of said useful portion of said transmission modes is and a highest order mode thereof have a difference in effective refractive index that is equal to or greater than 0.007.

39. The transmission fiber according to claim 28, wherein said substantial number of modes have characteristics of multimode transmission fibers.

40. A transmission fiber of a bend-loss tolerant multimode fiber transmission system for light propagating in standard multimode fiber modes, said transmission fiber comprising a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein said useful portion of said transmission modes propagates in a region of the core that has a diameter equal to or greater than ⅔ a diameter of a core of a standard multimode fiber.

41. A transmission fiber of a bend-loss tolerant multimode fiber transmission system for light propagating in standard multimode fiber modes, said transmission fiber comprising a core and a cladding surrounding said core, said transmission fiber supporting a group of transmission modes for light within a target spectral range, a useful portion of said transmission modes having high effective refractive indices relative to a refractive index of the cladding, said useful portion corresponding to a substantial number of modes, wherein said substantial number of modes correspond to modes of multimode fibers having a core diameter equal to or greater than 25 μm and a numerical aperture equal to or greater than 0.15.

42. The transmission fiber according to claim 28, wherein the core includes a maximum refractive index that is about 2% greater than a refractive index of the cladding.

43. The transmission fiber according to claim 28, wherein the cladding is doped with fluorine or $B_2O_3$ or any combination thereof.

44. The transmission fiber according to claim 28, wherein the core is doped with $GeO_2$ or $TiO_2$ or any combination thereof.

45. The transmission fiber according to claim 44, wherein the core is further doped with fluorine, $B_2O_3$, or $P_2O_5$, or any combination thereof.

46. The bend-loss tolerant multimode fiber transmission system according to claim 2, wherein a lowest order mode of said transmission modes of the transmission fiber belonging only to said useful portion and a highest order mode thereof have a difference in effective refractive index that is equal to or greater than 0.007.

47. The bend-loss tolerant multimode fiber transmission system according to claim 3, wherein a lowest order mode of said transmission modes of the transmission fiber belonging only to said useful portion and a highest order mode thereof have a difference in effective refractive index that is equal to or greater than 0.007.

48. The bend-loss tolerant multimode fiber transmission system according to claim 4, wherein a lowest order mode of said transmission modes of the transmission fiber belonging only to said useful portion and a highest order mode thereof have a difference in effective refractive index that is equal to or greater than 0.007.

49. The bend-loss tolerant multimode fiber transmission system according to claim 7, wherein a lowest order mode of said transmission modes of the transmission fiber belonging only to said useful portion and a highest order mode thereof have a difference in effective refractive index that is equal to or greater than 0.007.

50. The bend-loss tolerant multimode fiber transmission system according to claim 8, wherein a lowest order mode of said transmission modes of the transmission fiber belonging only to said useful portion and a highest order mode thereof have a difference in effective refractive index that is equal to or greater than 0.007.

51. The transmission fiber according to claim 35, wherein a lowest order mode of said useful portion of said transmission modes is and a highest order mode thereof have a difference in effective refractive index that is equal to or greater than 0.007.

52. The transmission fiber according to claim 36, wherein a lowest order mode of said useful portion of said transmission modes is and a highest order mode thereof have a difference in effective refractive index that is equal to or greater than 0.007.

53. The transmission fiber according to claim 37, wherein a lowest order mode of said useful portion of said transmission modes is and a highest order mode thereof have a difference in effective refractive index that is equal to or greater than 0.007.

54. The transmission fiber according to claim 40, wherein a lowest order mode of said useful portion of said transmission modes is and a highest order mode thereof have a difference in effective refractive index that is equal to or greater than 0.007.

55. The transmission fiber according to claim 41, wherein a lowest order mode of said useful portion of said transmission modes is and a highest order mode thereof have a difference in effective refractive index that is equal to or greater than 0.007.

* * * * *